US008118466B2

(12) United States Patent
Cho et al.

(10) Patent No.: US 8,118,466 B2
(45) Date of Patent: Feb. 21, 2012

(54) BACKLIGHT ASSEMBLY, DISPLAY DEVICE HAVING THE SAME, DISPLAY SUBSTRATE FOR THE SAME AND METHOD OF MANUFACTURING THE SAME

(75) Inventors: So-Haeng Cho, Seoul (KR); Jin-Wook Yang, Suwon-si (KR); Sang-Hun Lee, Seoul (KR); Hyo-Sang Yang, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/987,450

(22) Filed: Jan. 10, 2011

(65) Prior Publication Data

US 2011/0102407 A1    May 5, 2011

Related U.S. Application Data

(62) Division of application No. 11/451,010, filed on Jun. 12, 2006, now Pat. No. 7,909,497.

(30) Foreign Application Priority Data

Jul. 13, 2005  (KR) .................................. 2005-63388
Jul. 19, 2005  (KR) .................................. 2005-65312
Aug. 2, 2005   (KR) .................................. 2005-70713

(51) Int. Cl.
*F21V 7/04* (2006.01)
(52) U.S. Cl. .......... 362/613; 362/612; 362/616; 349/65; 349/68

(58) Field of Classification Search .................. 362/612, 362/613, 616; 349/62, 65, 68; 345/211
See application file for complete search history.

(56) References Cited

U.S. PATENT DOCUMENTS

| 5,613,751 | A | 3/1997 | Parker et al. |
| 6,648,486 | B2 * | 11/2003 | Harbers et al. ............... 362/613 |
| 7,004,611 | B2 | 2/2006 | Parker et al. |

FOREIGN PATENT DOCUMENTS

| JP | 07-013155 A | 1/1995 |
| JP | 2002-006315 A | 1/2002 |
| JP | 2003-172933 A | 6/2003 |
| JP | 2003-295184 A | 10/2003 |
| JP | 2004-145168 A | 5/2004 |

* cited by examiner

*Primary Examiner* — Stephen F Husar
(74) *Attorney, Agent, or Firm* — Cantor Colburn LLP

(57) ABSTRACT

A backlight assembly includes first and second backlight units independently operating based on driving modes, and a light blocking member interposed between the first and second backlight units. The first backlight assembly includes a first light source generating and supplying a first light to a main display part of a display panel in a main mode and turned-off in a sub mode. The second backlight assembly includes a second light source generating and supplying a second light having different color from the first light to a sub display part of the display panel in a main mode and a sub mode.

11 Claims, 28 Drawing Sheets

BACKLIGHT ASSEMBLY, DISPLAY DEVICE HAVING THE SAME, DISPLAY SUBSTRATE FOR THE SAME AND METHOD OF MANUFACTURING THE SAME

CROSS REFERENCE TO RELATED APPLICATIONS

This application is a divisional application of U.S. application Ser. No. 11/451,010 filed on Jun. 12, 2006, now U.S. Pat. No. 7,909,497, which claims priority to Korean Patent Application No. 2005-63388, filed on Jul. 13, 2005, Korean Patent Application No. 2005-65312, filed on Jul. 19, 2005, and Korean Patent Application No. 2005-70713, filed on Aug. 2, 2005, and all the benefits accruing therefrom under 35 U.S.C. §119, the contents of which is hereby incorporated herein by reference in their entireties.

BACKGROUND OF THE INVENTION

1. Field of the Invention

The present invention relates to a backlight assembly, a display device having the backlight assembly, a display substrate for the display device and a method of manufacturing the display substrate. More particularly, the present invention relates to a backlight assembly capable of decreasing a power consumption, a display device having the backlight assembly, which is capable of improving image display quality, a display substrate for the display device and a method of manufacturing the display substrate.

2. Description of the Related Art

A liquid crystal display (LCD) device, in general, is used for personal computers, notebook computers, automobile navigation systems, television receiver sets, etc. The LCD device converts an electric signal having image information into an image. The LCD device has various characteristics such as a light weight, a small size, a thin thickness, a low power consumption, etc., so that the LCD device has been widely used.

In a mobile LCD device, a display panel of the LCD device is divided into a main display part and a sub display part to improve optical characteristics and to decrease power consumption. For example, the sub display part constantly displays auxiliary information such as time, data, battery state, etc. The main display part selectively displays main information such as image of a camera, character, etc.

The main display part and the sub display part of the LCD device receive a light generated from a same light source. The main display part displays the image in a main driving mode, and the main display part does not display the image in a sub driving mode. In the sub driving mode, the light generated from the light source is incident into the main display part, but the main display part is turned off so that the image is not displayed by a black driving of the main display part of the display panel.

In the sub driving mode, the light incident into the main display part is unnecessary. Therefore, in order to decrease a power consumption of the LCD device, a current of the sub driving mode has a smaller amount than that of the main driving mode. However, when the amount of the current of the sub driving mode is decreased, a luminance of the light incident into the sub display part is decreased, thereby deteriorating an image display quality of the sub display part.

In addition, when the luminance of the backlight assembly is increased in order to improve the image display quality, the power consumption of the backlight assembly is also increased.

The LCD device having the main and sub display parts includes a color filter for displaying a color image. The color filter transmits a color light to display the color image based on the light generated from the backlight assembly. The color filter includes red, green and blue colorants. The red, green and blue colorants block a portion of the light generated from the backlight assembly, thereby decreasing a luminance of the LCD device. Therefore, in the sub driving mode, the luminance of the LCD device is greatly decreased by the decreased power consumption and the absorption of the light by the colorant, thereby deteriorating the image display quality of the sub display part.

BRIEF SUMMARY OF THE INVENTION

An exemplary embodiment provides a backlight assembly having light sources in main and sub regions, which is capable of decreasing power consumption.

Another exemplary embodiment provides a display device having the above-mentioned backlight assembly, which is capable of improving image display quality.

Another exemplary embodiment provides a display substrate for the above-mentioned display device.

Another exemplary embodiment provides a method of manufacturing the above-mentioned display substrate.

Another exemplary embodiment provides a display device having the above-mentioned display substrate, which is capable of improving an image display quality at a low current.

One exemplary embodiment of a backlight assembly includes a first backlight unit, a second backlight unit and a light blocking member. The first backlight unit supplies a main display part of a display panel with a first light in a main mode and is turned off in a sub mode. The second backlight unit supplies a sub display part of the display panel with a second light in both of the main mode and the sub mode. The light blocking member is interposed between the first and second backlight units to prevent a light leakage of the first light from the first backlight unit to the second backlight unit and a light leakage of the second light from the second backlight unit to the first backlight unit.

Another exemplary embodiment of a backlight assembly includes a light source unit and a light guiding unit. The light source unit includes a first light source and a second light source. The first light source generates a first light. The second light source generates a second light having a different color from the first light. The light guiding unit guides the first and second lights generated from the light source unit.

An exemplary embodiment of a display device includes a display panel, a backlight assembly and a driving circuit part. The display panel includes a main display part and a sub display part. The main display part selectively displays a main image. The sub display part constantly displays a sub image. The backlight assembly includes a first backlight unit and a second backlight assembly unit. The first backlight unit supplies the main display part with a first light. The second backlight unit supplies the sub display part with a second light. The driving circuit part controls the first and second backlight units so that a driving electric power is applied to the first backlight unit in a main mode and a driving electric power is applied to the second backlight unit in the main driving mode and a sub mode.

Another exemplary embodiment of a display device includes a backlight assembly and a display panel. The backlight assembly includes a first light source, a second light source and a light guiding unit. The first light source generates a first light. The second light source generates a second light having a different color from the first light. The light guiding unit guides the first and second lights. The display panel includes a main display part and a sub display part. The main display part changes a color of the first light to display main images. The sub display part displays sub images using the second light. A color of the second light is substantially unchanged.

An exemplary embodiment of display substrate includes a base substrate, a plurality of switching elements and a reflecting plate. The base substrate has a sub driving region and a main driving region. The switching elements are in pixel regions that are in the sub driving region and the main driving region, respectively. The reflecting plate is electrically connected to each of the switching elements in the sub driving region to reflect an externally provided light.

An exemplary embodiment of a method of manufacturing a display is provided as follows. A switching element having a drain electrode outputting a data signal is formed on a base substrate having a sub driving region and a main driving region. A protective insulating layer is formed on an insulating layer that covers the switching element. The protective insulating layer has a contact hole through which the drain electrode is partially exposed. A transparent electrode is formed on the protective insulating layer. The transparent electrode is electrically connected to the drain electrode exposed through the contact hole. A reflecting plate is formed on the transparent electrode in the sub driving region. The reflecting plate divides a pixel region in the sub driving region into a reflection portion and a transmission portion.

Another exemplary embodiment of a display device includes a display substrate, an opposite substrate and a liquid crystal layer. The display substrate includes a first substrate, a switching element and a reflecting plate. The first substrate has a sub driving region and a main driving region. The switching element is in each of pixel regions in the sub driving region and the main driving region. The reflecting plate is in the pixel regions in the sub driving region to be electrically connected to the switching element. An externally provided light is reflected from the reflecting plate. The opposite substrate corresponds to the display substrate. The liquid crystal layer is interposed between the display substrate and the opposite substrate.

In exemplary embodiments, the backlight assembly can be used for various display devices such as a liquid crystal display (LCD) device, an electrophoresis display device, etc. The display device includes the LCD device, an organic light emitting display (OLED) device, the electrophoresis display device, etc.

In exemplary embodiments of the backlight assembly and the display device, the different lights are incident into the main and sub display parts, so that the main and sub display parts may be independently operated. Therefore, a power consumption of the backlight assembly and the display device is decreased, and a luminance of the sub display part is increased.

BRIEF DESCRIPTION OF THE DRAWINGS

The above and other advantages of the present invention will become more apparent by describing in detail example embodiments thereof with reference to the accompanying drawings, in which.

DETAILED DESCRIPTION OF THE INVENTION

Figure 1:
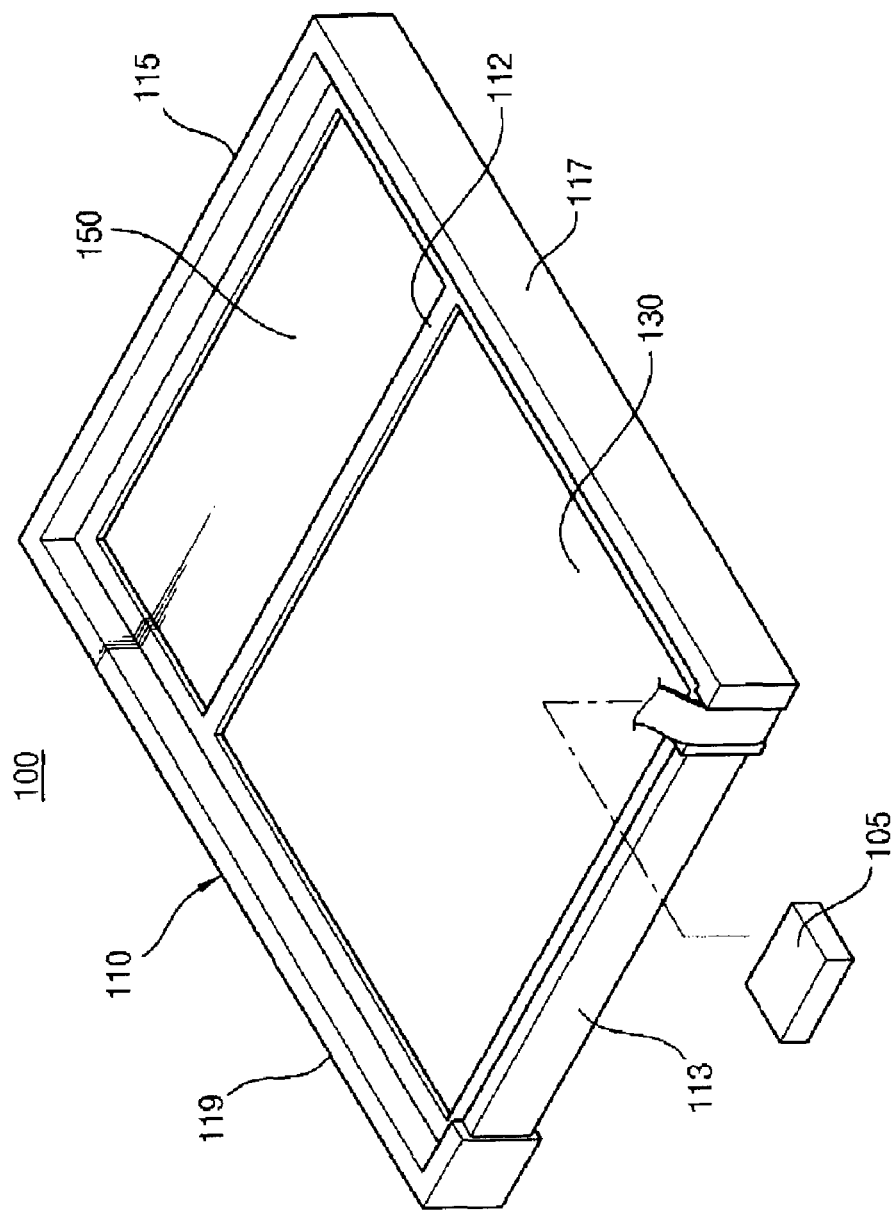
FIG. 1 is a perspective view illustrating an exemplary embodiment of a backlight assembly in accordance with the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented as "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 2:
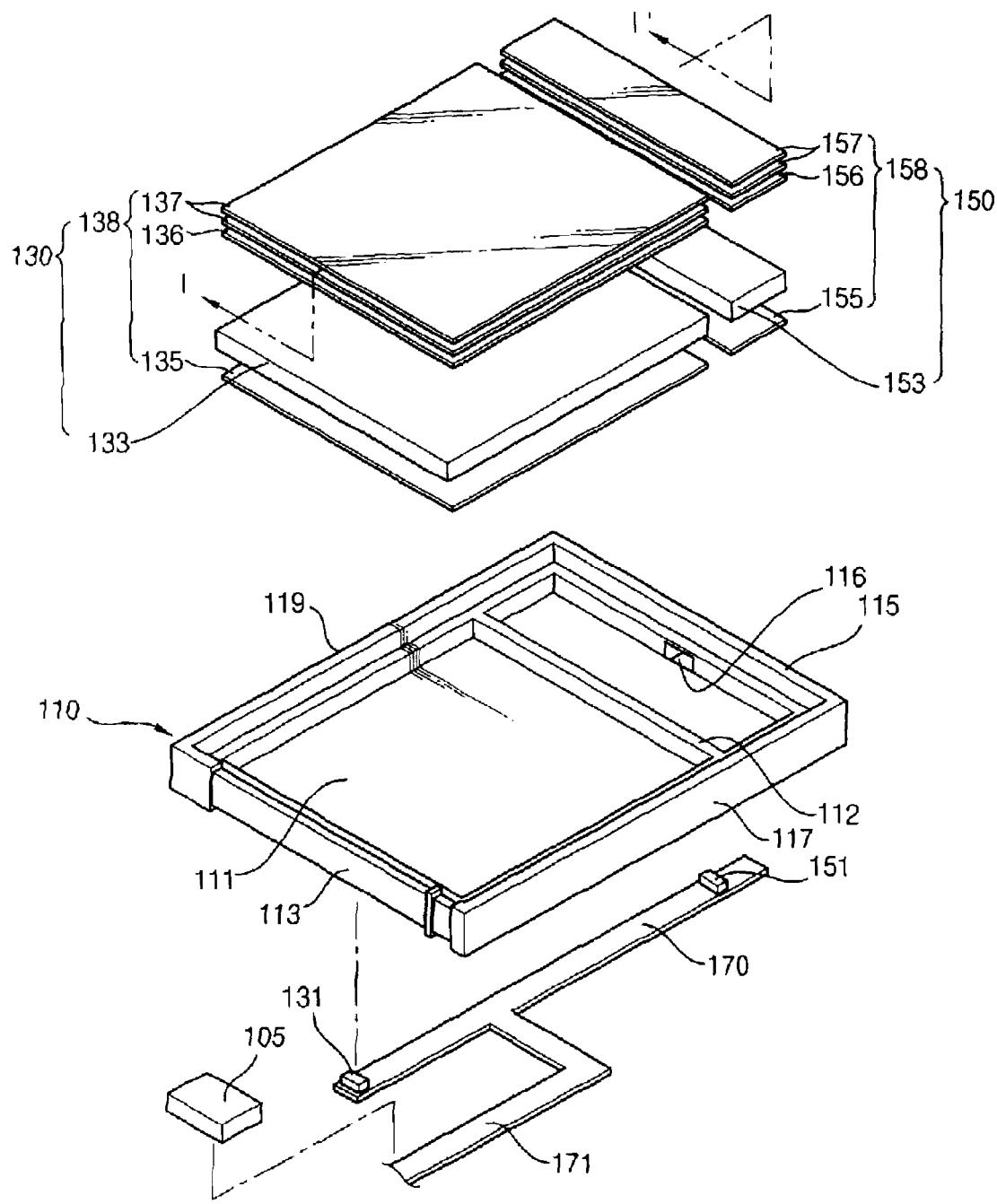
FIG. 2 is an exploded perspective view illustrating the backlight assembly shown in FIG. 1.

FIG. 1 is a perspective view illustrating an exemplary embodiment of a backlight assembly in accordance with the present invention. FIG. 2 is an exploded perspective view illustrating the backlight assembly shown in FIG. 1.

Referring to FIGS. 1 and 2, the backlight assembly 100 includes a first backlight unit 130, a second backlight unit 150 and a light blocking member 112.

The backlight assembly 100 supplies a light to a display panel including a main display part and a sub display part. Main images are selectively displayed on the main display part. Sub images are constantly displayed on the sub display part. The first and second backlight units 130 and 150 generate the light in a main driving mode. In a sub driving mode, the first backlight unit 130 does not generate the light and the second backlight unit 150 generates the light.

The first backlight unit 130 generates a first light in the main driving mode and does not generate the first light in the sub driving mode.

The first backlight unit 130 includes a first light source 131 and a first light guiding unit 133.

The first light source 131 supplies the first light guiding unit 133 with the first light. In FIG. 2, the first light source 131 includes a light-emitting diode (LED). Alternative exemplary embodiments may include the first light source 131 as a lamp.

The first light guiding unit 133 guides the first light toward the main display part to increase a luminance uniformity of the first light. The first light guiding unit 133 may include a light guiding material having various characteristics such as high light transmittance, high heat resistance, high chemical resistance, high mechanical strength, etc. Exemplary embodiments of a material that can be used for the first light guiding unit 133 include, but are not limited to, polymethylmethacrylate (PMMA), polyamide, polyimide, polypropylene, polyurethane and any combination including at least one of the foregoing. In FIG. 2, the first light guiding unit 133 has a substantially flat shape. Alternative exemplary embodiments may include configurations where the first light guiding unit 133 may have a wedge shape. That is, a thickness of the first light guiding unit 133 may be decreased as a distance from a light incident surface of the first light guiding unit 133 is increased.

The first backlight unit 130 may further include first optical sheets 138.

The first optical sheets 138 improve optical characteristics of the first light exiting the first light guiding unit 133. The first optical sheets 138 may include a first reflecting sheet 135, a first diffusion sheet 136 and/or a first brightness enhancement sheet 137.

The first reflecting sheet 135 is under the first light guiding unit 133. A portion of the light leaked from the first light guiding unit 133 is reflected from the first reflecting sheet 135 toward the first light guiding unit 133.

The first diffusion sheet 136 is disposed on the first light guiding unit 133 to diffuse the first light exiting the first light guiding unit 133, thereby increasing luminance uniformity.

The first brightness enhancement sheet 137 is disposed on the first diffusion sheet 136 to increase a luminance when the displace device including the backlight assembly is viewed on a plane. In FIG. 2, the first light guiding unit 133 includes two first brightness enhancement sheets 137 and longitudinal directions of the first brightness enhancement sheets 137 are substantially in parallel to each other. In alternative exemplary embodiments, there may be any of a number of first optical sheets 138 and/or first brightness enhancement sheets 137 as is suitable for the purposes described herein.

The second backlight unit 150 generates a second light in the main driving mode and the sub driving mode. The second backlight unit 150 includes a second light source 151 and a second light guiding unit 153.

The second light source 151 supplies the second light guiding unit 153 with the second light. In FIG. 2, the second light source 151 includes a light-emitting diode. Alternative exemplary embodiments may include the second light source 151 as a lamp.

The second light guiding unit 153 guides the second light having increased luminance uniformity toward the sub display part.

The second backlight unit 150 may further include second optical sheets 158. The second optical sheets 158 improve optical characteristics such as luminance uniformity, a luminance when viewed on a plane, etc., of the second light exiting the second light guiding unit 153. The second optical sheets 158 may include a second reflecting sheet 155, a second diffusion sheet 156 and/or a second brightness enhancement sheet 157. The second reflecting sheet 155, the second diffusion sheet 156 and the second brightness enhancement sheet 157 of the second backlight unit 150 are substantially the same as the first reflecting sheet 135, the first diffusion sheet 136 and the first brightness enhancement sheet 137 of the first backlight unit 130. Thus, any further explanation concerning the above elements for the second backlight unit 150 will be omitted.

The backlight assembly 100 may further include a receiving container 110 to receive the first and second backlight units 130 and 150. The receiving container 110 includes a bottom plate 111, a first sidewall 113, a second sidewall 115, a third sidewall 117 and a fourth sidewall 119.

The first, second, third and fourth sidewalls 113, 115, 117 and 119 are protruded from edges or sides of the bottom plate 111. Alternative exemplary embodiments include configurations where the bottom plate 111 may have an opening to decrease an overall weight and size of the backlight assembly 100. The first sidewall 113 faces (and are considered opposite to) the second sidewall 115. The third sidewall 117 faces the fourth sidewall 119. Each of the third and fourth sidewalls 117 and 119 is connected to the first and second sidewalls 113 and 115, respectively.

A first recess (not shown) is formed on the first sidewall 113, and a hole (not shown) is formed through a peripheral portion of the bottom plate 111 corresponding to the first recess (not shown). A second recess 116 is formed on the second sidewall 115, and a hole is formed through a peripheral portion of the bottom plate 111 corresponding to the second recess 116. In exemplary embodiments, first and second guiding grooves may be formed on an outer surface of the first sidewall 113.

The light blocking member 112 is interposed between the first backlight unit 130 and the second backlight unit 150 to optically isolate the first backlight unit 130 from the second backlight unit 150. That is, the light blocking member 112 prevents a leakage of the first light from the first backlight unit 130 to the second backlight unit 150 and a leakage of the second light from the second backlight unit 150 to the first backlight unit 130. The light blocking member 112 may be a blocking wall protruded from the bottom plate 111 as illustrated in FIG. 2. Alternative exemplary embodiments may include configurations where the light blocking member 112 may be a light blocking sheet between the first and second light guiding units 133 and 153.

The light blocking member 112 divides a receiving space of the receiving container 110 into a main receiving region and a sub receiving region. The bottom plate 111, the light blocking member 112 and the first, third and fourth sidewalls 113, 117 and 119 define the main receiving region. The bottom plate 111, the light blocking member 112 and the second, third and fourth sidewalls 115, 117 and 119 define the sub receiving region. The bottom plate 111 corresponding to the main receiving region has a first area. The bottom plate 111 corresponding to the sub receiving region has a second area that is smaller than the first area.

Figure 3:
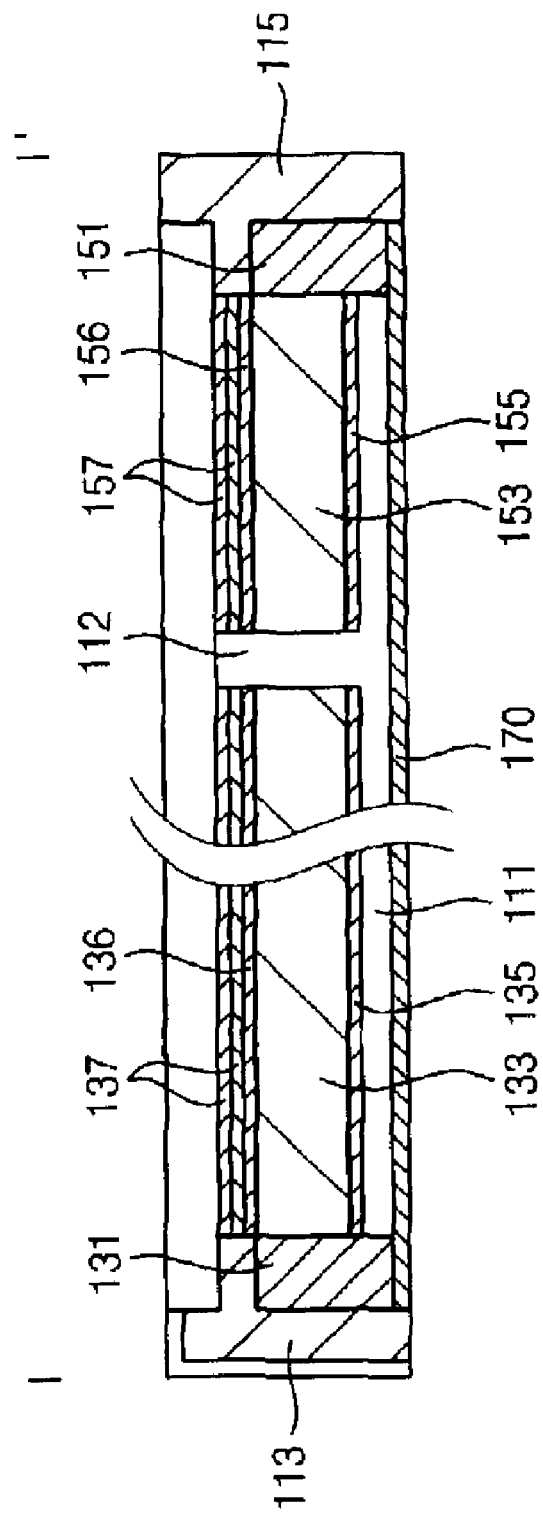
FIG. 3 is a cross-sectional view taken along line I-I' shown in FIG. 2.

FIG. 3 is a cross-sectional view taken along line I-I' shown in FIG. 2.

Referring to FIGS. 2 and 3, the first reflecting sheet 135, the first light guiding unit 133, the first diffusion sheet 136 and the first brightness enhancement sheet 137 are received in the main receiving region, in sequence. The second reflecting sheet 155, the second light guiding unit 153, the second diffusion sheet 156 and the second brightness enhancement sheet 157 are received in the sub receiving region, in sequence.

The backlight assembly 100 may further include a power supplying part 105 (FIGS. 1 and 2) and a power printed circuit film 170, such as an electric power supplying part and an electric power printed circuit film.

The electric power supplying part 105 may be electrically connected to the first and second light sources 131 and 151 through the electric power printed circuit film 170. The electric power printed circuit film 170 is extended from the first sidewall 113 of the receiving container 110 toward the second sidewall 115. The first light source 131 is mounted on a first end portion of the electric power printed circuit film 170 adjacent to the first sidewall 113. The second light source 151 is mounted on a second end portion of the electric power printed circuit film 170, and the second end portion is opposite to the first end portion of the electric power printed circuit film 170. The first light source 131 is received in the first recess (not shown) of the first sidewall 113 through the hole (not shown) of the bottom plate 111 corresponding to the first recess (not shown). The second light source 151 is received in the second recess 116 of the second sidewall 115 through the hole of the bottom plate 111 corresponding to the second recess 116. The electric power printed circuit film 170 may further include an electric power transmitting line 171 that is extended from the electric power printed circuit film 170. The electric power printed circuit film 170 may be electrically connected to the electric power supplying part 105 through the electric power transmitting line 171.

Figure 4A:
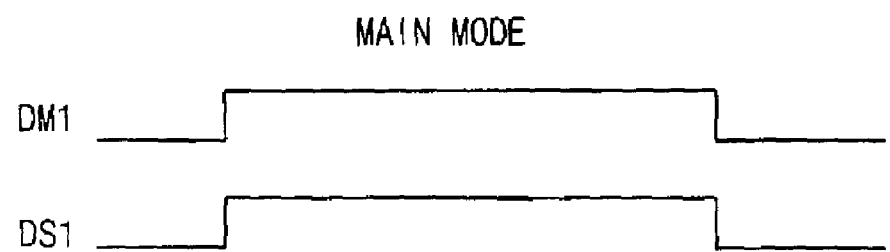
FIGS. 4A and 4B are timing diagrams illustrating an exemplary embodiment of an operation of the backlight assembly shown in FIG. 1.
Figure 4B:
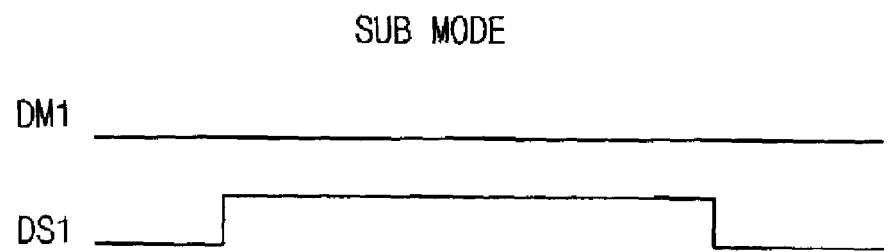

FIGS. 4A and 4B are timing diagrams illustrating an exemplary embodiment of an operation of the backlight assembly shown in FIG. 1.

Referring to FIGS. 2 to 4B, in the main mode, the electric power supplying part 105 applies an electric power for driving the first light source DM1 (131 shown in FIG. 2) and the second light source DS1 (151 shown in FIG. 2). In the sub mode, the electric power supplying part 105 applies the electric power to the second light source DS1, so that the second light source DS1 generates the second light, and the first light source DM1 does not generate the first light. Therefore, a power consumption of the sub mode is decreased and an amount of the second light incident into the sub display part is increased in the sub mode.

Figure 5:
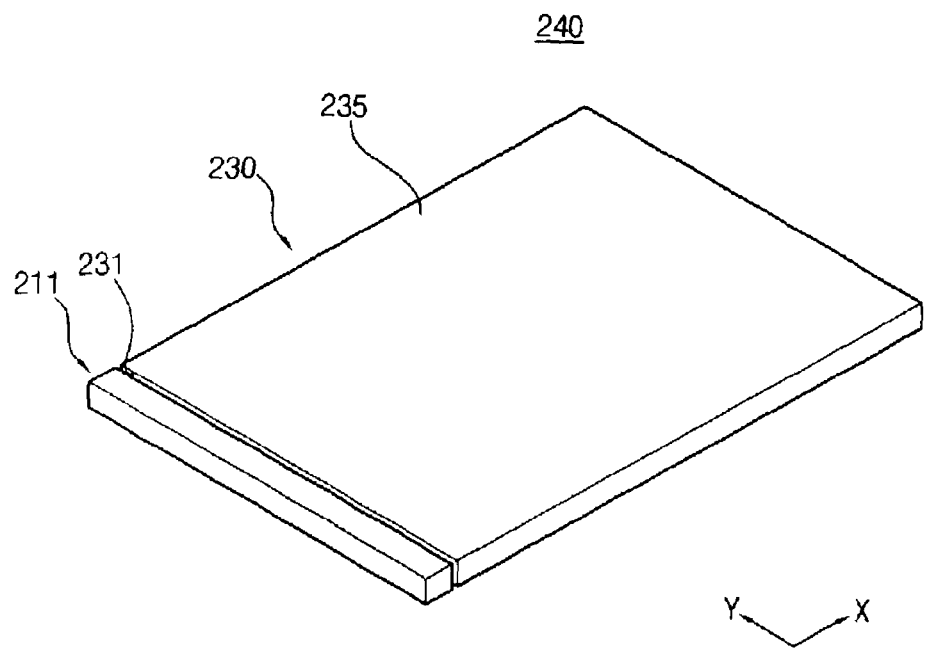
FIG. 5 is a perspective view illustrating another exemplary embodiment of a backlight assembly in accordance with another embodiment of the present invention.

FIG. 5 is a perspective view illustrating another exemplary embodiment of a backlight assembly in accordance with the present invention. In an exemplary embodiment as illustrated in FIG. 5, the backlight assembly may be substantially frame shaped. For orientation purposes, a Cartesian coordinate system may be used where a first side of the display device extends along a Y-axis direction, and a second side of the display device extends along an X-axis direction, where the Y-axis is substantially perpendicular to the X-axis.

Referring to FIG. 5, the backlight assembly 240 includes a light source unit 211 and a light guiding unit 230. The backlight assembly 240 supplies a light to a display panel including a main display part and a sub display part. Main images and sub images are selectively displayed on the main display part and the sub display part, respectively. That is, the backlight assembly 240 is driven in the main mode for driving the main display part of the display panel to form a main screen, and is driven in the sub mode for driving the sub display part of the display panel to form a sub screen using a smaller power consumption than the main mode.

The light source unit 211 may generate lights of various colors based on driving modes. In exemplary embodiments, the light source unit 211 may include a first light source (not shown) and a second light source (not shown). The first light source (not shown) generates a first light to supply the main display part with the first light in the main mode. The second light source (not shown) generates a second light to supply the sub display part with the second light in the sub mode. The second light may have a different color from the first light. In one exemplary embodiment, the first light is a white light and the second light is a colored light. The colored light may include one of red, green and blue lights.

The light guiding unit 230 guides the first light or the second light toward the display panel. In FIG. 5, the light guiding unit 230 includes a light incident surface 231 and a light exiting surface 235.

The light incident surface 231 faces the light source unit 211. The first light or the second light that is incident into the light guiding unit 230 through the light incident surface 231 is repetitively reflected and refracted in the light guiding unit 230 to exit the light exiting surface 235.

The light guiding unit 230 guides the first and second lights and diffuses the first and second lights to an end portion of the light guiding unit 230 facing the light incident surface 231, so that the first and second lights exiting the light exiting surface 235 have a planar shape. That is, the first and second lights may exit an entire of the light exiting surface 235.

Figure 6:
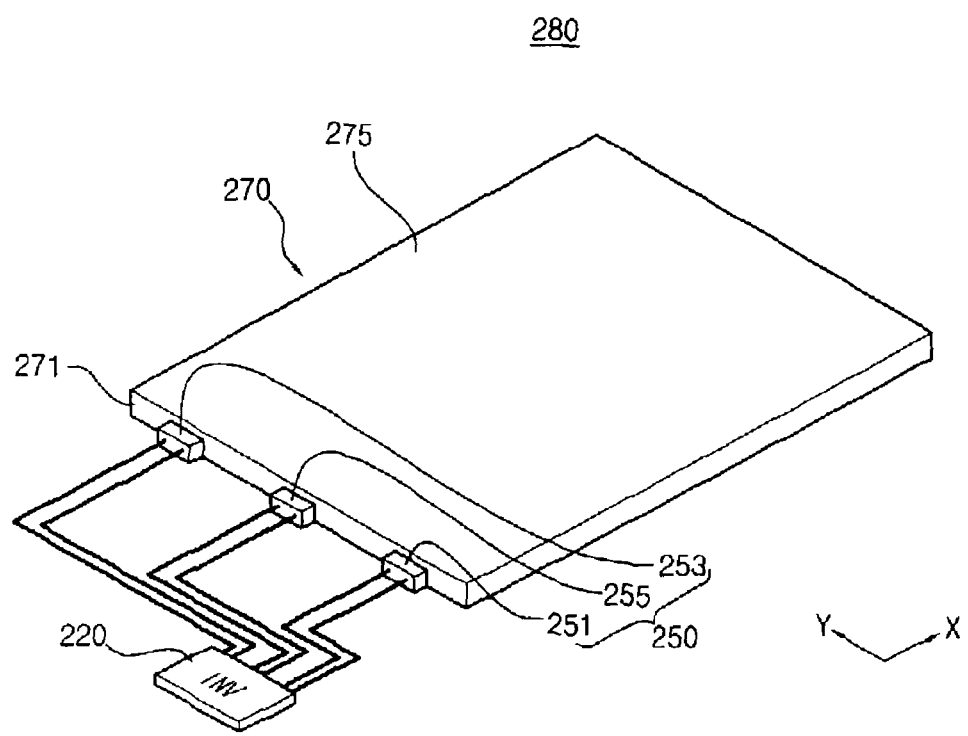
FIG. 6 is a perspective view illustrating another exemplary embodiment of a backlight assembly in accordance with another embodiment of the present invention.

FIG. 6 is a perspective view illustrating another exemplary embodiment of a backlight assembly in accordance with the present invention.

Referring to FIG. 6, the backlight assembly 280 includes a light source unit 250 and a light guiding unit 270.

The light source unit 250 includes a first light source and a second light source.

The first light source generates a first light that may be a white light. The second light source generates a second light that may be a colored light such as being one of red, green and blue lights. The color of the first light generated from the first light source and the color of the second light generated from the second light source may be changed or reversed. In FIG. 6, each of the first and second light sources may include a light-emitting diode. The light-emitting diode directly converts an electric power into the light so that the light-emitting diode has various characteristics such as a long lifetime, a low power consumption, etc.

In FIG. 6, the first light source includes two first light-emitting diodes 251 and 253 that generate the white light. The second light source includes a second light-emitting diode 255 that generates one of the red, green and blue lights. The number of the light-emitting diodes and the location of the light-emitting diodes with respect to the light guiding unit 270 may be changed based on a size and a luminance of the backlight assembly 280. Alternative exemplary embodiments may include configurations where each of the first and second light sources may include a lamp.

The backlight assembly 280 may further include an electric power supplying part 220 that applies an electric power to the first and second light sources.

The electric power supplying part 220 is electrically connected to the first and second light-emitting diodes 251, 253 and 255. In the main mode, the electric power supplying part 220 applies the electric power to the first light-emitting diodes 251 and 253. In the sub mode, the electric power supplying part 220 applies the electric power to the second light emitting diode 255.

In the main mode, the first light of the white color exits the light guiding unit 270. In the sub mode, the second light of one of the red, green and blue colors exits the light guiding unit 270.

In FIG. 6, the light guiding unit 270 has a substantially flat shape including a light incident surface 271 and a light exiting surface 275. Alternative exemplary embodiments include configurations where the light guiding unit 270 may have a wedge shape. That is, a thickness of the light guiding unit 270 may be decreased, as a distance from the light incident surface 271 of the light guiding unit 270 is increased. The light incident surface 271 forms a side surface of the light guiding unit 270, and the light exiting surface 275 is connected to the light incident surface 271 forming a predetermined angle with respect to the light incident surface 271.

In FIG. 6, two first light-emitting diodes 251 and 253 are on the light incident surface 271 of the light guiding unit 270, and one second light-emitting diode 255 is on the light incident surface 271 between the first light-emitting diodes 251 and 253. That is, the first light-emitting diodes 251 and 253 and the second light-emitting diode 255 are arranged substantially in parallel with the light incident surface 271 of the light guiding unit 270. The first light or the second light is incident into the light guiding unit 270 through the light incident surface 271 based on the mode of the backlight assembly 280. The guided first light or the second light exits the light exiting surface 275.

The light guiding unit 270 may include a light guiding material having various characteristics such as high light transmittance, high heat resistance, high chemical resistance, high mechanical strength, etc. Examples of a material that can be used for the light guiding unit 270 include polymethylmethacrylate (PMMA), polyamide, polyimide, polypropylene, polyurethane, etc.

Figure 7:
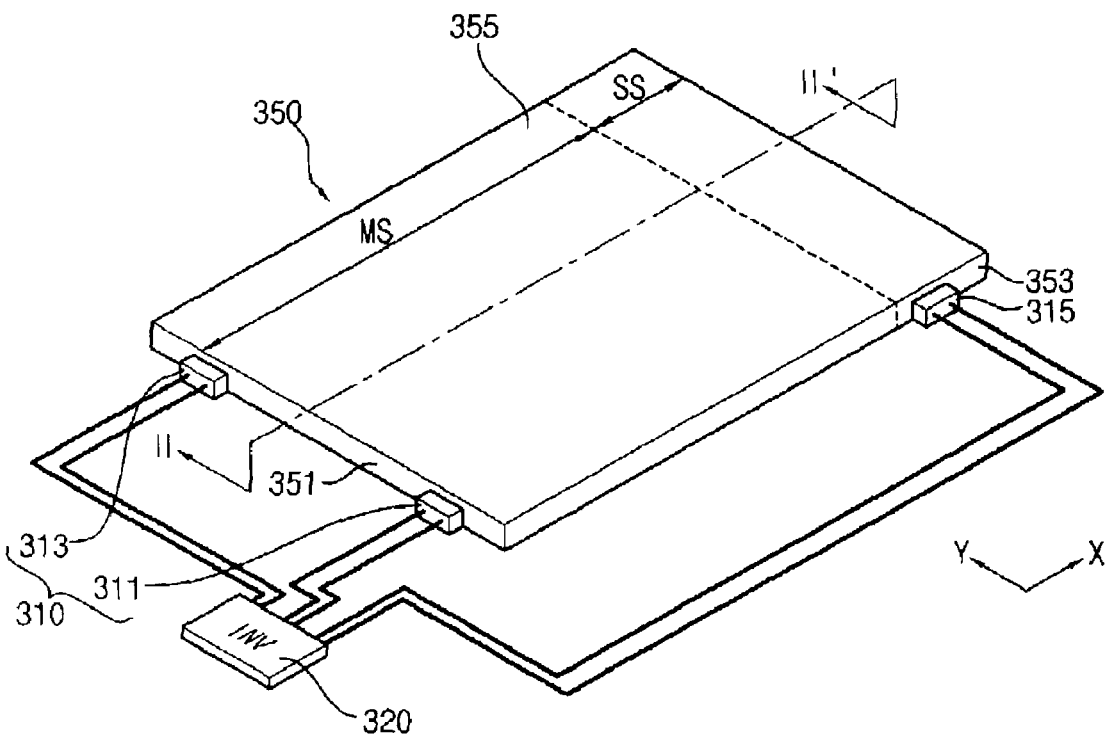
FIG. 7 is a perspective view illustrating another exemplary embodiment of a backlight assembly in accordance with another embodiment of the present invention.

FIG. 7 is a perspective view illustrating another exemplary embodiment of a backlight assembly in accordance with the present invention.

Referring to FIG. 7, the backlight assembly 300 includes a light source unit 310, an electric power supplying part 320 and a light guiding unit 350. The backlight assembly of FIG. 7 is the same as in FIG. 2 except for a location of a light source unit. Thus, any further explanation concerning the above elements will be omitted.

The light source unit 310 includes first light-emitting diodes 311 and 313 and a second light-emitting diode 315. In one exemplary embodiment, the first light-emitting diodes 311 and 313 generate a first light that may be a white light and the second light-emitting diodes 315 generates a second light that may be one of red, green and blue lights.

The light guiding unit 350 includes a substantially plate shape having a first side surface 351, a second side surface 353 and a light exiting surface 355. The first side surface 351 is substantially in parallel with a first (traverse) direction (y-direction) of the light guiding unit 350. The second side surface 353 is substantially in parallel with a second (longitudinal) direction (x-direction) that is substantially in perpendicular to the first direction.

The light exiting surface 355 is connected between the first and second side surfaces 351 and 353. The light exiting surface 355 includes a main region MS and a sub region SS that is substantially parallel with the main region MS in the first direction. The first light-emitting diodes 311 and 313 are disposed on the first surface 351 and the second light-emitting diode 315 is disposed on the second side surface 353.

Alternative exemplary embodiments include configurations where the second light-emitting diode 315 may be on a third surface of the light guiding unit 350 facing the first side surface 351 or on a fourth surface opposite to the second surface 353 in FIG. 7.

Figure 8A:
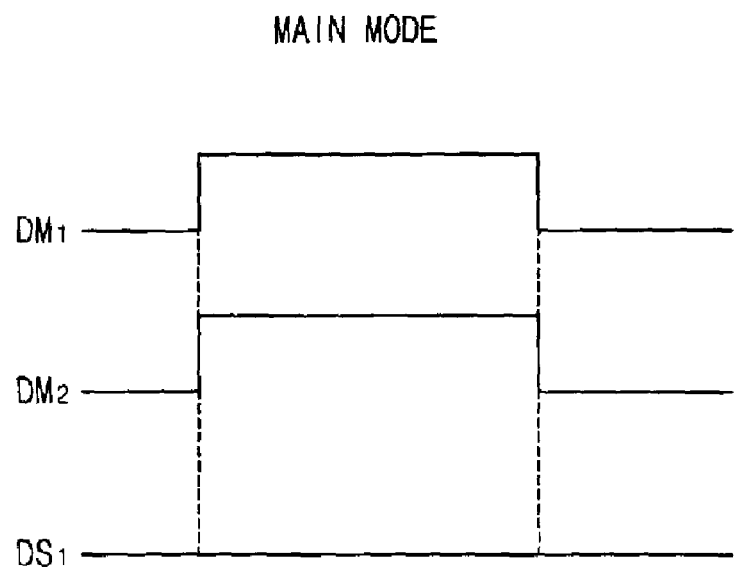
FIG. 8A is a timing diagram illustrating an exemplary embodiment of a driving signal applied to first and second light sources shown in FIG. 7 in a main driving mode.
Figure 8B:
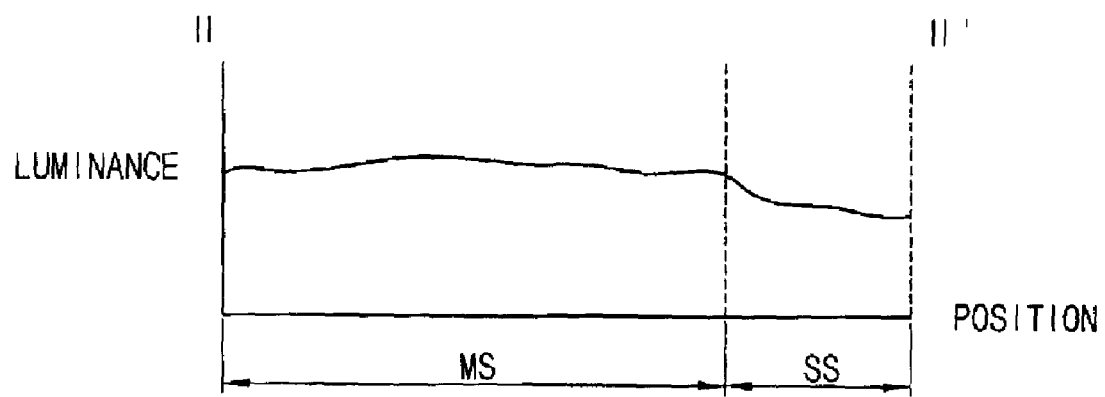
FIG. 8B is a graph illustrating an exemplary embodiment of a luminance along a cross-section taken along line II-II' shown in FIG. 7 in a main driving mode.

FIG. 8A is a timing diagram illustrating an exemplary embodiment of a driving signal applied to first and second light sources shown in FIG. 7 in a main mode. FIG. 8B is a graph illustrating an exemplary embodiment of a luminance along a cross-section taken along line II-II' shown in FIG. 7 in a main mode.

Referring to FIGS. 7, 8A and 8B, in the main mode, the electric power supplying part 320 applies an electric power to the first light-emitting diodes DM1 and DM2 (311 and 313 shown in FIG. 7), and does not apply the electric power to the second light-emitting diode DS1 (315 shown in FIG. 7). Therefore, the white light generated from the first light-emitting diodes DM1 and DM2 (311 and 313 shown in FIG. 7) is incident into the light guiding unit 350 through the first side surface 351.

The first light is the white light that may not be refracted on the first side surface 351. The first light is incident into the first side surface 351 at a predetermined incident angle. The first light that is incident into the light guiding unit 350 through the first surface 351 is repetitively reflected and refracted in the light guiding unit 350 to exit the light exiting surface 355. An incident angle of the first light with respect to the light exiting surface 355 is decreased, as the number of the reflection and refraction is increased. Therefore, the guided first light exits the light exiting surface 355 at a uniform luminance.

Referring again to FIGS. 7 and 8B, the first light exits the main and sub regions MS and SS of the light exiting surface 355. A luminance difference between the main and sub regions MS and SS is negligible, so that the guided first light exits the light exiting surface 355 at the uniform luminance.

Figure 9A:
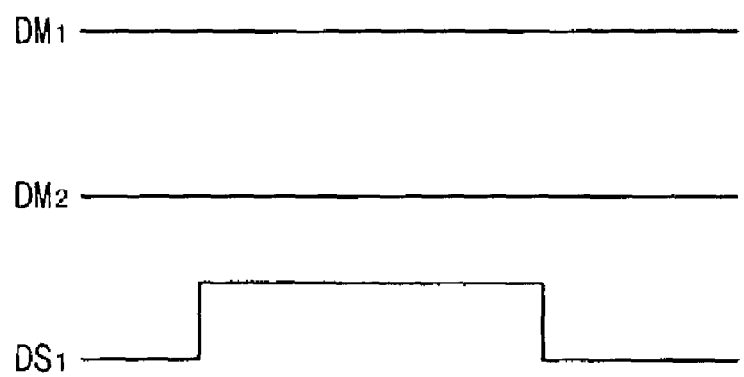
FIG. 9A is a timing diagram illustrating an exemplary embodiment of a driving signal applied to first and second light sources shown in FIG. 7 in a sub driving mode.
Figure 9B:
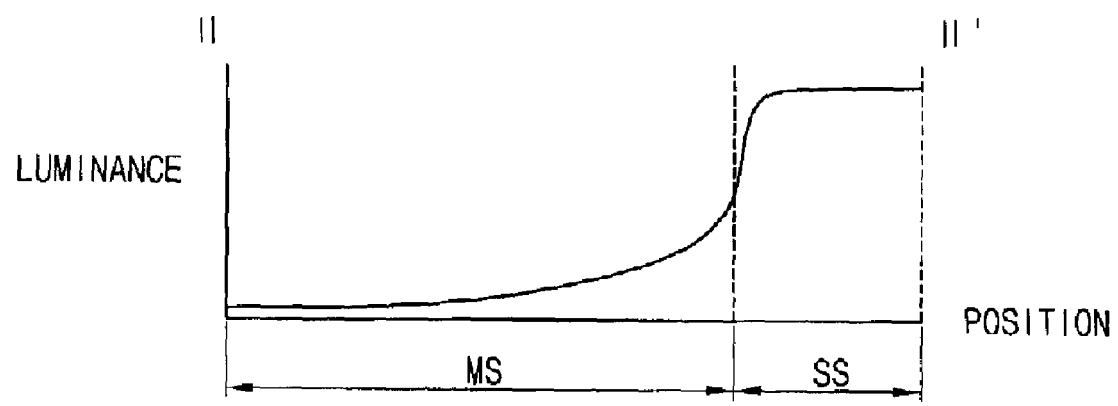
FIG. 9B a graph illustrating an exemplary embodiment of a luminance along a cross-section taken along line II-II' shown in FIG. 7 in a sub driving mode.

FIG. 9A is a timing diagram illustrating an exemplary embodiment of a driving signal applied to first and second light sources shown in FIG. 7 in a sub mode. FIG. 9B a graph illustrating an exemplary embodiment of a luminance along a cross-section taken along line II-II' shown in FIG. 7 in a sub mode.

Referring to FIGS. 7, 9A and 9B, in the sub mode, the electric power supplying part 320 applies the electric power to the second light-emitting diode DS1 (315 shown in FIG. 7), and does not apply the electric power to the first light-emitting diodes DM1 and DM2 (311 and 313 shown in FIG. 7). Therefore, one of the red, green and blue lights generated from the second light-emitting diode DS1 (315 shown in FIG. 7) is incident into the light guiding unit 350 through the second side surface 353.

The second light is one of the red, green and blue lights that may be refracted toward the second direction (x-direction) on the second side surface 353. The second light that is incident into the light guiding unit 350 through the second surface 353 is repetitively reflected and refracted in the light guiding unit 350 to exit the light exiting surface 355. An incident angle of the second light with respect to the light exiting surface 355 is decreased, as the number of the reflection and refraction is increased. In FIG. 9B, the guided second light is concentrated on the sub region SS.

Figure 10:
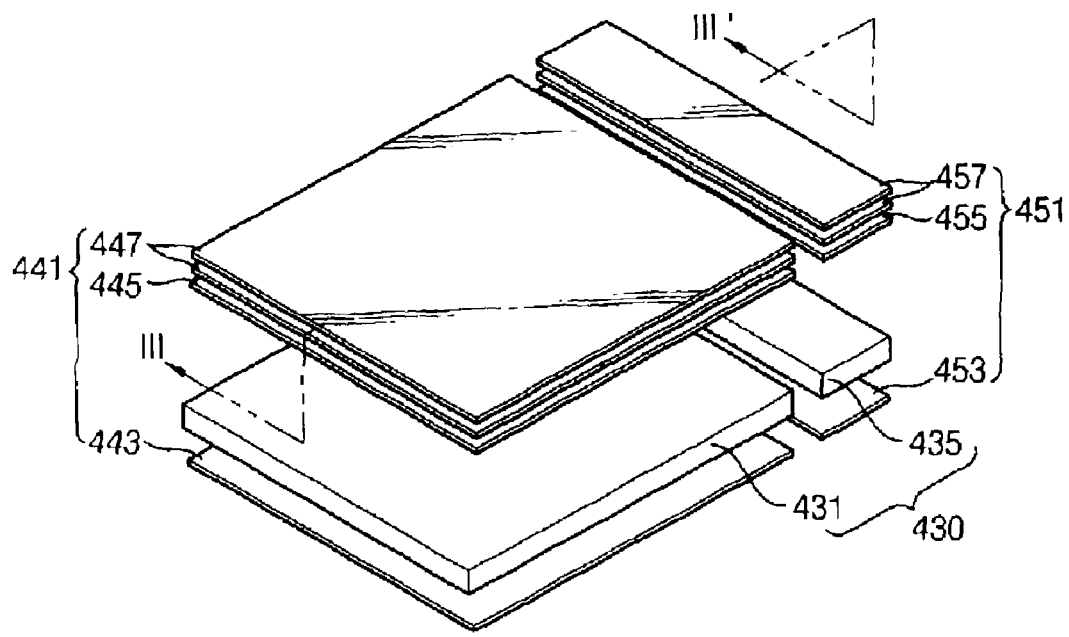
FIG. 10 is an exploded perspective view illustrating a backlight assembly in accordance with another embodiment of the present invention.
Figure 10:
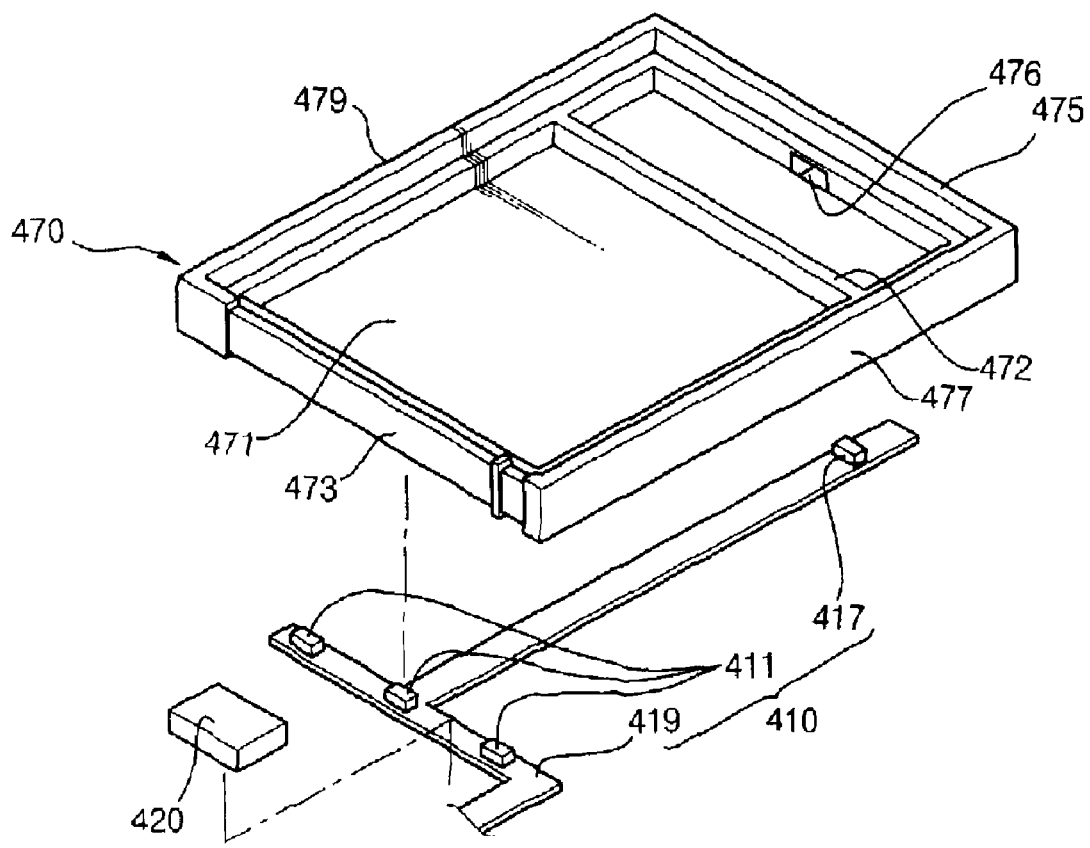

FIG. 10 is an exploded perspective view illustrating an exemplary embodiment of a backlight assembly in accordance with the present invention.

Referring to FIG. 10, the backlight 400 includes a light source unit 410 and a light guiding unit 430. The light source unit 410 of the backlight assembly of FIG. 10 is the same as the light source unit 310 in FIG. 7 except for the number of first light-emitting diodes and an electric power printed circuit film 419. Thus, any further explanation concerning the above elements will be omitted.

The light source unit 410 includes a first light source and a second light source. The first light source generates a first light and the second light source generates a second light. In exemplary embodiments, the second light may have a different color from the first light. In FIG. 10, the first light source includes a plurality of first light-emitting diodes 411 and the second light source includes a second light-emitting diode 417.

The light source unit 410 may further include the electric power printed circuit film 419. The electric power printed circuit film 419 may have a substantially T-shape. The electric power printed circuit film 419 may further include an electric power transmitting line that is electrically connected to the first and second light-emitting diodes 411 and 417. The electric power printed circuit film 419 may be electrically connected to the electric power supplying part 420. Three of the first light-emitting diodes 411 are on an upper portion of the T-shaped electric power printed circuit film 419. The second light-emitting diode 417 is on a lower portion of the T-shaped electric power printed circuit film 419.

The backlight assembly 400 may further include the electric power supplying part 420. The electric power supplying part 420 is electrically connected to the electric power printed circuit film 419. The electric power supplying part 420, unlike the electric power supplying part 320 in FIG. 7, applies an electric power to the first and second light-emitting diodes 411 and 417 in the main mode and applies the electric power to the second light-emitting diode 417 in the sub mode.

Figure 11A:
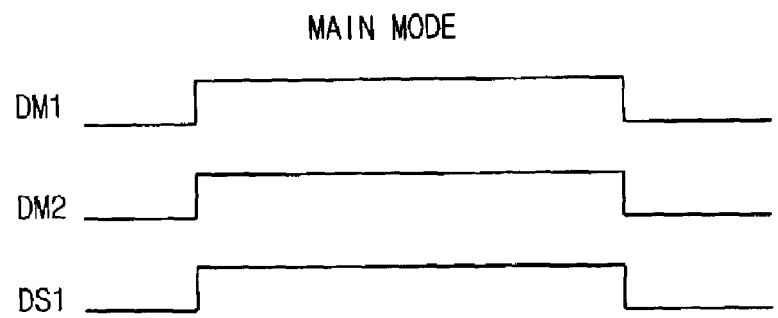
FIGS. 11A and 11B are timing diagrams illustrating driving signals applied to first and second light-emitting diodes shown in FIG. 10.
Figure 11B:
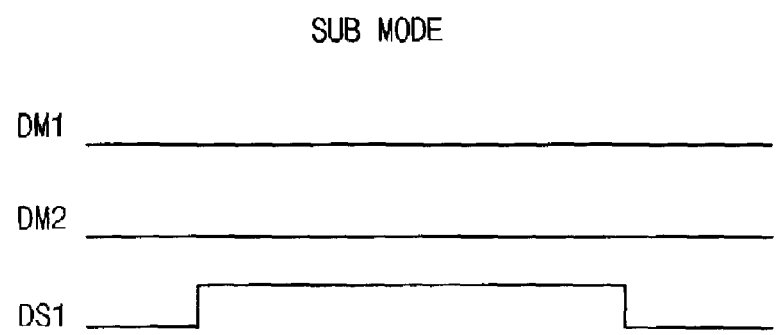

FIGS. 11A and 11B are timing diagrams illustrating driving signals applied to first and second light-emitting diodes shown in FIG. 10.

Referring to FIGS. 11A and 11B, the first light-emitting diodes DM1 and DM2 (411 shown in FIG. 10) generates a first light that may be the white light in the main mode and does not generate the first light in the sub mode. The second light-emitting diode DS1 (417 shown in FIG. 10) generates a second light that may be one of the red, green and blue lights in the main mode and the sub mode. That is, the second light-emitting diode DS1 (417 shown in FIG. 10) of the backlight assembly 400, unlike the backlight assemblies 240, 280, and 300 constantly generates the second light in the main mode as well as in the sub mode.

Figure 12:
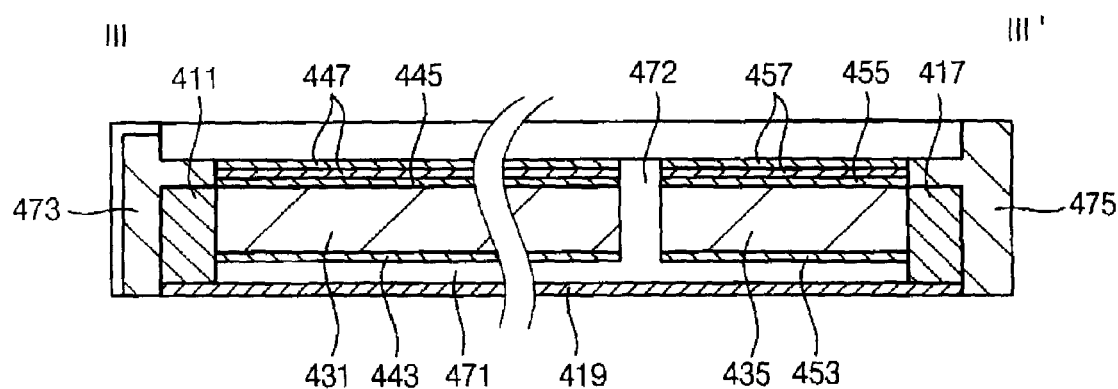
FIG. 12 is a cross-sectional view taken along a line III-III' shown in FIG. 10.

FIG. 12 is a cross-sectional view taken along line III-III' shown in FIG. 10.

Referring to FIGS. 10 and 12, the backlight assembly 400 may further include a receiving container 470. The receiving container 470 includes a bottom plate 471, a first sidewall 473, a second sidewall 475, a third sidewall 477 and a fourth sidewall 479.

Alternative exemplary embodiments may include configurations where the bottom plate 471 may have an opening to decrease weight and size of the backlight assembly 400. The first, second, third and fourth sidewalls 473, 475, 477 and 479 are protruded from sides of the bottom plate 471. The first sidewall 473 faces the second sidewall 475. The third sidewall 477 faces the fourth sidewall 479. Each of the third and fourth sidewalls 477 and 479 is connected to the first and second sidewalls 473 and 475, respectively.

Three of first recesses (not shown) are formed on the first sidewall 473, and three holes (not shown) are formed through a peripheral portion of the bottom plate 471 corresponding to the first recesses (not shown). A second recess 476 is formed on the second sidewall 475 and a hole is formed through a peripheral portion of the bottom plate 471 corresponding to the second recess 476.

The first light sources 411 are received in the first recesses (not shown) of the first sidewall 473 through the holes (not shown) of the bottom plate 471 corresponding to the first recesses (not shown), respectively. The second light source 417 is received in the second recess 476 of the second sidewall 475 through the hole of the bottom plate 471 corresponding to the second recess 476. A first guiding groove and a second guiding groove may be formed on an outer surface of the first sidewall 473. An upper portion of the T-shaped electric power printed circuit film 419 is bent and surrounds the second guiding groove. The electric power printed circuit film 419 is electrically connected to the electric power supplying part 420.

The receiving container 470 may further include a partition wall 472. The partition wall 472 is interposed between the first and second sidewalls 473 and 475 and is connected to the third and fourth sidewalls 477 and 479.

The partition wall 472 divides a receiving space of the receiving container 470 into a main receiving region and a sub receiving region. The bottom plate 471, the partition wall 472 and the first, third and fourth sidewalls 473, 477 and 479 define the main receiving region. The bottom plate 471, the partition wall 472 and the second, third and fourth sidewalls 475, 477 and 479 define the sub receiving region. The bottom plate 471 corresponding to the main receiving region has a first area. The bottom plate 471 corresponding to the sub receiving region has a second area that is smaller than the first area.

The light guiding unit 430 includes a main light guiding plate 431 a sub light guiding plate 435 and optical sheets.

The main and sub light guiding plates 431 and 435 have a substantially the same material as the light guiding unit shown in FIGS. 5 to 7, and thus any further explanation concerning the above elements will be omitted.

The main light guiding plate 431 is received in a main receiving region of the receiving container 470 and the sub light guiding plate 435 is received in a sub receiving region of the receiving container 470. The main light guiding plate 431 is substantially in parallel with the sub light guiding plate 435.

The main light guiding plate 431 guides the first light that is incident into the main light guiding plate 431 through a side surface facing the first sidewall 473 toward an upper portion of the backlight assembly 400. The sub light guiding plate 435 guides the second light that is incident into the sub light guiding plate 435 through a side surface facing the second sidewall 475 toward the upper portion of the backlight assembly 400

The partition wall 472 is interposed between the main light guiding plate 431 and the sub light guiding plate 435, so that the main light guiding plate 431 is optically isolated from the sub light guiding plate 435. In exemplary embodiments, a highly reflective layer may be formed on the partition wall 472 to promote an efficiency of light use. In one exemplary embodiment, an aluminum layer is formed on the partition wall 472.

The optical sheets include main optical sheets 441 and sub optical sheets 451.

The main optical sheets 441 improve optical characteristics of the first light exiting the main light guiding plate 431. The main optical sheets 441 include a main reflecting sheet 443, a main diffusion sheet 445 and a main brightness enhancement sheet 447.

The main reflecting sheet 443 is interposed between the bottom plate 471 and the main light guiding plate 431. A portion of the first light leaked from the main light guiding plate 431 is reflected from the main reflecting sheet 443 toward the main light guiding plate 431. The main diffusion sheet 445 is on the main light guiding plate 431 to diffuse the first light, thereby increasing a luminance uniformity of the first light.

The main brightness enhancement sheet 447 is on the main diffusion sheet 445 to increase a luminance of the first light when viewed on a plane. In FIG. 10, the main brightness enhancement sheet 447 includes two brightness enhancement sheets having different longitudinal directions that are substantially in perpendicular to each other.

The sub optical sheets 451 improve optical characteristics of the second light exiting the sub light guiding plate 451. The sub optical sheets 451 include a sub reflecting sheet 453, a sub diffusion sheet 455 and a sub brightness enhancement sheet 457. The sub optical sheets 451 are substantially the same as the main optical sheets 441 except for a size, and thus any further explanation concerning the above elements will be omitted. Alternative exemplary embodiments may include the sub optical sheets 451 including a dual brightness enhancement film (DBEF).

Figure 13:
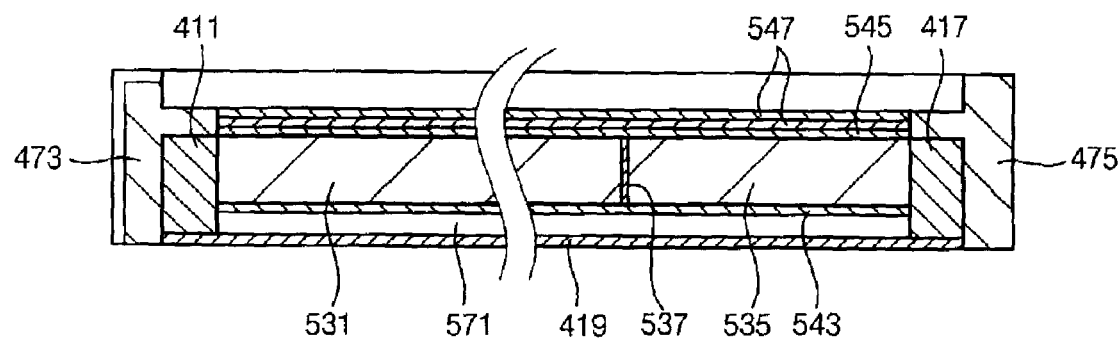
FIG. 13 is a cross-sectional view illustrating another exemplary embodiment of a backlight assembly in accordance with the present invention.

FIG. 13 is a cross-sectional view illustrating another exemplary embodiment of a backlight assembly in accordance with the present invention.

Referring to FIG. 13, the backlight assembly 500 includes a light source unit, an electric power supplying part, a light guiding unit and a receiving container. The backlight assembly of FIG. 13 is the same as in FIGS. 10 to 12 except for a light guiding unit and a receiving container. Thus, the same reference numerals will be used to refer to the same or like parts as those described in FIGS. 10 to 12 and any further explanation concerning the above elements will be omitted.

The light guiding unit of FIG. 13 is the same as in FIGS. 10 to 12 except for optical sheets and a reflecting layer. In FIGS. 10 to 12, the light guiding unit is divided into the main light guiding sheets and the sub light guiding sheets. However, in FIG. 13, the light guiding unit includes the optical sheets for covering main and sub light guiding plates and the reflecting layer. Thus, any further explanation concerning the above elements will be omitted.

The optical sheets improve optical characteristics of a first light exiting a main light guiding plate 531 and a second light exiting a sub light guiding plate 535. The optical sheets include a reflecting sheet 543, a diffusion sheet 545 and a brightness enhancement sheet 547.

The reflecting sheet 543 is interposed among the bottom plate 571 and the main and sub light guiding plates 531 and 535. A portion of the first light leaked from the main light guiding plate 531 and a portion of the second light leaked from the sub light guiding plate 535 are reflected from the reflecting sheet 543 toward the main and sub light guiding plates 531 and 535.

A reflecting layer 537 is interposed between the main and sub light guiding plates 531 and 535. The reflecting layer 537 includes a highly reflective material such as an aluminum. The reflecting layer 537 may be coated on a surface of the main light guiding plate 531 or the sub light guiding plate 535. In alternative exemplary embodiments, the reflecting layer 537 may be attached to the surface of the main light guiding plate 531 or the sub light guiding plate 535.

The diffusion sheet 545 is on the main and sub light guiding plates 531 and 535 to diffuse the first light exiting the main light guiding plate 531 and the second light exiting the sub light guiding plate 535, thereby increasing a luminance uniformity of the first and second lights.

The brightness enhancement sheet 547 is on the diffusion sheet 545 to increase a luminance of the first and second lights when viewed on a plane. In FIG. 13, the brightness enhancement sheet 547 includes two brightness enhancement sheets having different longitudinal directions that are substantially in perpendicular to each other.

The receiving container of FIG. 13 is substantially the same as in FIGS. 10 to 12 except the partition wall. In FIG. 13, the partition wall is omitted. Thus, any further explanation concerning the above elements will be omitted.

Figure 14:
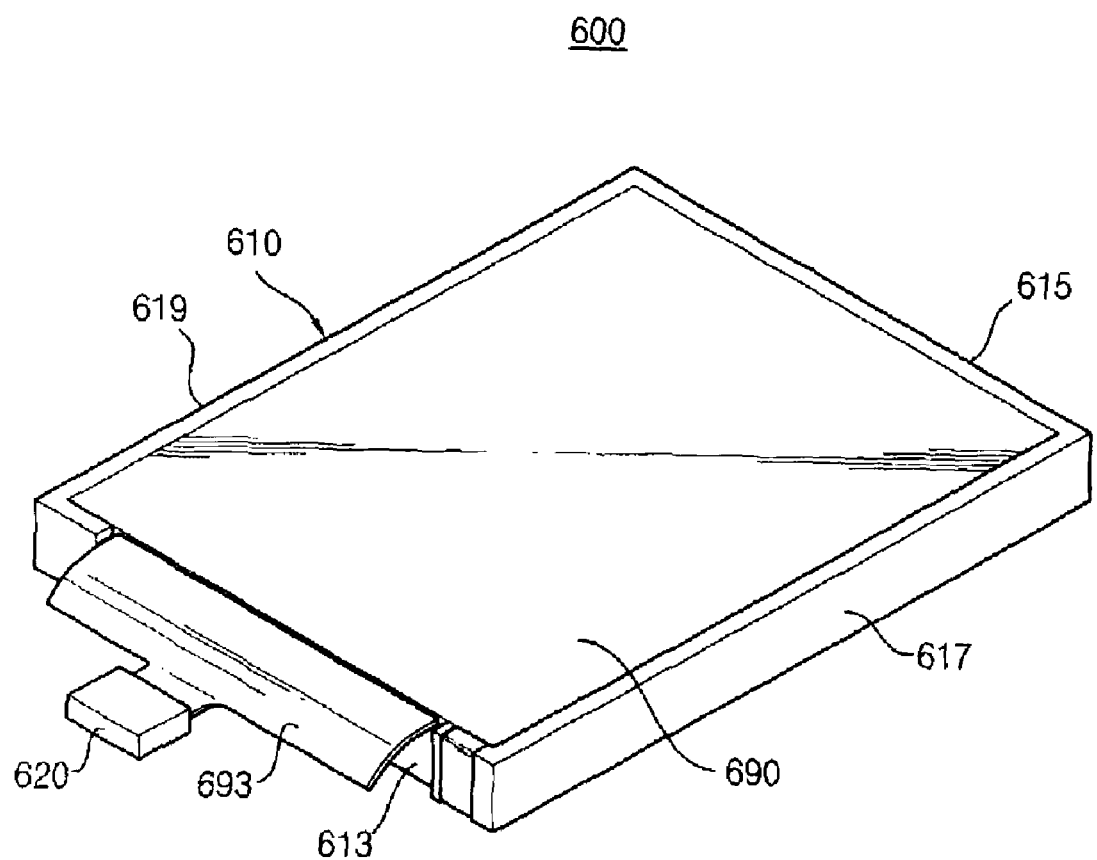
FIG. 14 is a perspective view illustrating an exemplary embodiment of a display device in accordance with the present invention.
Figure 15:
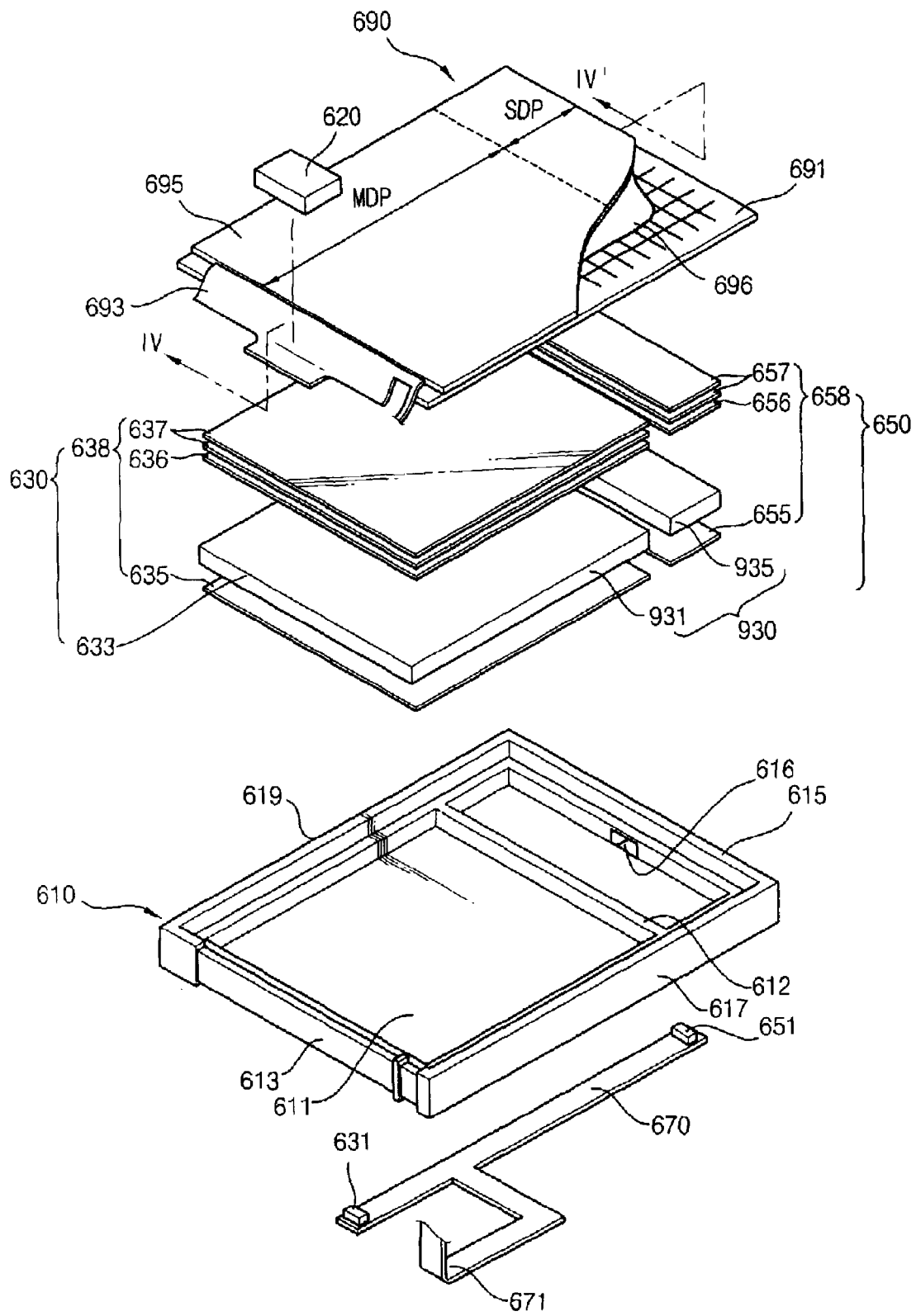
FIG. 15 is an exploded perspective view illustrating the display device shown in FIG. 14.

FIG. 14 is a perspective view illustrating an exemplary embodiment of a display device in accordance with the present invention. FIG. 15 is an exploded perspective view illustrating the display device shown in FIG. 14.

Referring to FIGS. 14 and 15, the display device 600 includes a display panel 690, a backlight assembly and a driving circuit member 620. The backlight assembly includes a first backlight assembly unit 630 and a second backlight assembly unit 650. The first and second backlight assembly units of FIGS. 14 and 15 are substantially the same as in FIGS. 1 to 3, and thus any further explanation concerning the above elements will be omitted.

The display device 600 may further include an electric power printed circuit film 670 and a receiving container 610. The electric power printed circuit film and the receiving container of FIGS. 14 and 15 are substantially the same as in FIGS. 1 to 3, and thus any further explanation concerning the above elements will be omitted.

Figure 16:
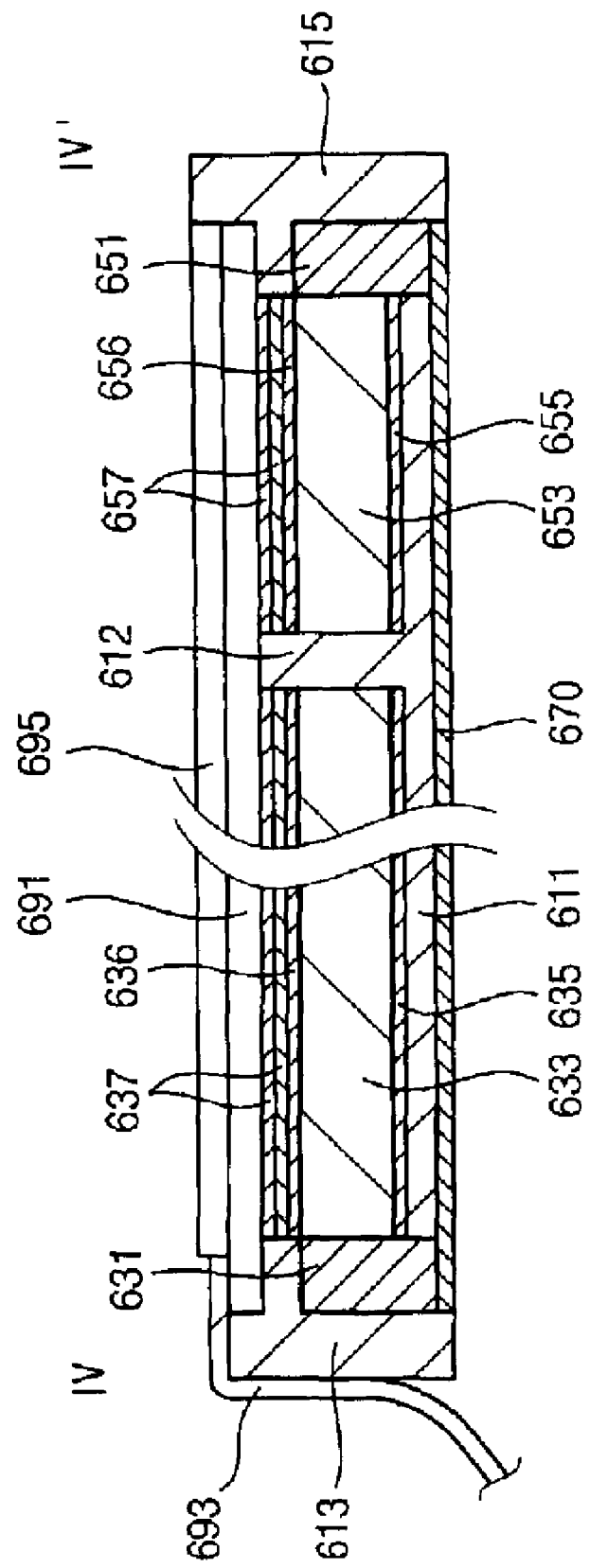
FIG. 16 is a cross-sectional view taken along line IV-IV' shown in FIG. 15.

FIG. 16 is a cross-sectional view taken along line IV-IV' shown in FIG. 15.

Referring to FIGS. 14 to 16, the display panel 690 displays images using a first light generated from the first backlight assembly unit 630 and a second light generated from the second backlight assembly unit 650. The display panel 690 includes a main display part MDP and a sub display part SDP. In a main mode, a main image is displayed on the main display part MDP and a sub image is displayed on the sub display part SDP. In a sub mode, the main image is not displayed on the main display part MDP and the sub image is displayed on the sub display part SDP.

The main display part MDP displays main images based on the first light generated from the first backlight unit 630 in the main mode. The main images may include a moving image, a character, etc. The main images are not displayed on the main display part MDP in the sub mode.

The sub display part SDP displays the sub images based on the second light generated from the second backlight unit 650 in the main mode and the sub mode. The sub images may include a time, a data, a battery state, etc.

The display panel 690 includes a first substrate 691, a second substrate 695 and a liquid crystal layer 696. The display panel 690 may driven in a dual mode having the main mode and the sub mode.

The first substrate 691 is on stepped portions of first, second, third and fourth sidewalls 613, 615, 617 and 619 of the receiving container 610. The first substrate 691 may include a lower substrate (not shown) and a plurality of thin film transistors (TFTs) (not shown). The lower substrate may include a transparent insulating material. The thin film transistors are arranged on the lower substrate in a substantially matrix shape. The thin film transistors correspond to pixel electrodes of the first substrate 691. Each of the pixel electrodes may include a transparent conductive material. Each of the thin film transistors applies a panel driving signal to each of the pixel electrodes.

In order to drive the first substrate 691 in the main and sub modes, the first substrate 691 includes a main pixel part (not shown) and a sub pixel part (not shown). In the main mode, a first driving signal is applied to a portion of the pixel electrodes on the main pixel part to display a main image. In the main mode and the sub mode, a second driving signal is applied to a portion of the pixel electrodes on the sub pixel part to display a sub image.

The second substrate 695 is spaced apart from the first substrate 691 by a substantially constant distance. The second substrate 695 may include an upper substrate and red, green and blue color filters. The red, green and blue color filters correspond to the pixel electrodes, respectively. The red, green and blue color filters are arranged on the upper substrate in a substantially matrix shape. Each of the red, green and blue color filters transmits a color light to display color images. A common electrode may be formed on an entire of the second substrate 695 facing the first substrate 691. The common electrode may include a transparent conductive material.

The second substrate 695 includes a main color filter part (not shown) and a sub color filter part (not shown). The main color filter part of the second substrate 695 corresponds to the main pixel part of the first substrate 691. The main color filter part and the main pixel part form the main display part MDP. The sub color filter part of the second substrate 695 corresponds to the sub pixel part of the first substrate 691. The sub color filter part and the sub pixel part form the sub display part SDP. The red, green and blue color filters of the main color filter part may have a different size from the red, green and blue color filters of the sub color filter part, so that the main display part MDP may have a different resolution from the sub display part SDP.

The second substrate 695 may further include a black matrix. The black matrix is between the red, green and blue color filters to define regions of the red, green and blue color filters and a boundary between the main and sub display parts MDP and SDP.

The display panel 690 may further include a panel printed circuit film 693. The panel printed circuit film 693 applies a driving signal to drive the display panel 690. The panel printed circuit film 693 is electrically connected to an end portion of the first substrate 691.

The panel printed circuit film 693 is bent and surrounds the first sidewall 613 along the first guiding groove that is formed on an outer surface of the first sidewall 613. A first terminal of the panel printed circuit film 693 is electrically connected to a driving circuit member 620. A second terminal of the panel printed circuit film 693 is electrically connected to the electric power printed circuit film 670 along a second guiding groove that is formed on the outer surface of the first sidewall 613.

The driving circuit member 620 applies the electric power to a first light-emitting diode 631 of the first backlight unit 630 and a second light-emitting diode 651 of the second backlight unit 650 in the main mode. In addition, the driving circuit member 620 applies the electric power to the second light-emitting diode 651 of the second backlight unit 650 in the sub mode. That is, in the sub mode, the second light generated from the second light-emitting diode 651 is incident into the sub display part SDP of the display panel 690, and the first light is not generated from the first light-emitting diode 631.

When the driving signal is applied to the display panel 690, an electric field is formed between the first and second substrates 691 and 695. Liquid crystals of the liquid crystal layer 696 vary in arrangement in response to the electric field applied thereto, and a light transmittance of the first light generated from the first backlight unit 630 to pass through the liquid crystal layer 696 or the second light generated the liquid crystal layer 696 to pass through the liquid crystal layer 696 is changed, thereby displaying image having a predetermined gray-scale.

The first backlight unit 630 includes a first light source 631 and a first light guiding unit 633. The first light source 631 supplies the first light guiding unit 633 with the first light. The first light guiding unit 633 guides the first light toward the main display part to increase a luminance uniformity of the first light. The first light guiding unit 633 may include a light guiding material having various characteristics such as high light transmittance, high heat resistance, high chemical resistance, high mechanical strength, etc.

The first backlight unit 630 may further include first optical sheets 638. The first optical sheets 638 improve optical characteristics of the first light exiting the first light guiding unit 633. The first optical sheets 638 may include a first reflecting sheet 635, a first diffusion sheet 636 and/or a first brightness enhancement sheet 637.

The second backlight unit 650 includes a second light source 651 and a second light guiding unit 653. The second light source 651 supplies the second light guiding unit 653 with the second light. The second light guiding unit 653 guides the second light having increased luminance uniformity toward the sub display part.

The second backlight unit 650 may further include second optical sheets 658. The second optical sheets 658 improve optical characteristics such as luminance uniformity, a luminance when viewed on a plane, etc., of the second light exiting the second light guiding unit 653. The second optical sheets 658 may include a second reflecting sheet 655, a second diffusion sheet 656 and/or a second brightness enhancement sheet 657.

A first recess (not shown) is formed on the first sidewall 613, and a hole (not shown) is formed through a peripheral portion of the bottom plate 611 corresponding to the first recess (not shown). A second recess 616 is formed on the second sidewall 615, and a hole is formed through a peripheral portion of the bottom plate 611 corresponding to the second recess 616. In exemplary embodiments, first and second guiding grooves may be formed on an outer surface of the first sidewall 613.

The light blocking member 612 is interposed between the first backlight unit 630 and the second backlight unit 650 to optically isolate the first backlight unit 630 from the second backlight unit 650.

Figure 17:
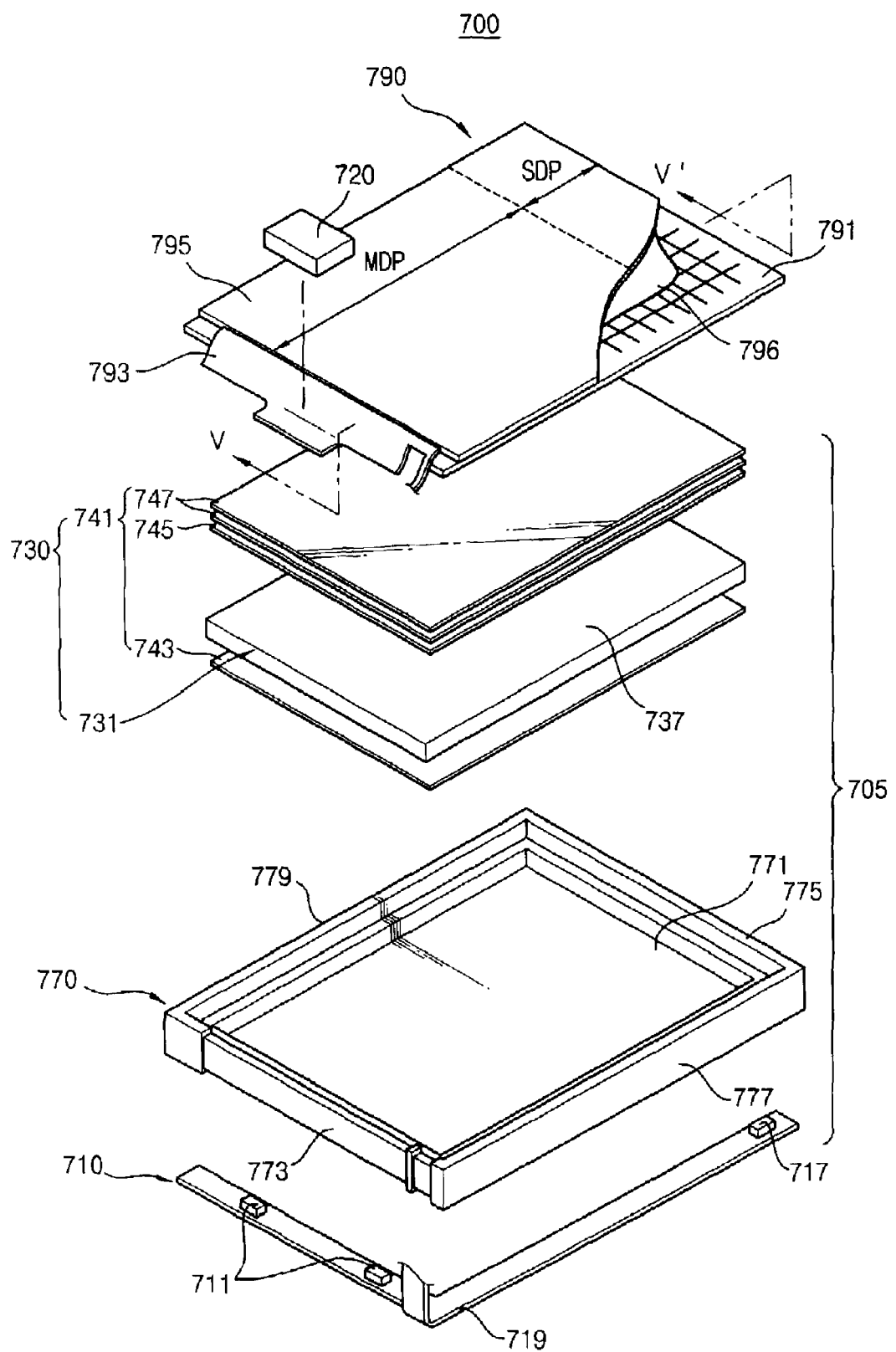
FIG. 17 is an exploded perspective view illustrating another exemplary embodiment of a display device in accordance with the present invention.

The light blocking member 612 divides a receiving space of the receiving container 610 into a main receiving region and a sub receiving region. The bottom plate 611, the light blocking member 612 and the first, third and fourth sidewalls 613, 617 and 619 define the main receiving region. The bottom plate 611, the light blocking member 612 and the second, third and fourth sidewalls 615, 617 and 619 define the sub receiving region. The bottom plate 611 corresponding to the main receiving region has a first area. The bottom plate 611 corresponding to the sub receiving region has a second area that is smaller than the first area. FIG. 17 is an exploded perspective view illustrating another exemplary embodiment of a display device in accordance with the present invention.

Referring to FIG. 17, the display device 700 includes a backlight assembly 705 and a display panel 790.

The backlight assembly 705 generates a first light in a main mode and generates a second light in a sub mode. The second light has a different color from the first light. A driving method of the backlight assembly of FIG. 17 is substantially the same as in FIGS. 7 to 9B, and thus any further explanation concerning the above element will be omitted. The backlight assembly 705 includes a light source unit 710, a driving circuit member 720, a light guiding unit 730 and a receiving container 770.

The light source unit 710 may further include an electric power printed circuit film 719. The light source unit of FIG. 17 is substantially the same as in FIG. 7 except for the electric power printed circuit film, and thus any further explanation concerning the above element will be omitted.

The electric power printed circuit film 719 may have a substantially L-shape. In FIG. 17, the electric power printed circuit film 719 may further include an electric power transmitting line that is electrically connected to two first light-emitting diodes 711 and a second light-emitting diode 717. The electric power printed circuit film 719 may be electrically connected to the electric power supplying part 720. The first light-emitting diodes 711 are on an upper portion of the L-shaped electric power printed circuit film 719. The second light-emitting diode 717 is on a lower portion of the L-shaped electric power printed circuit film 719.

The driving circuit member 720 is electrically connected to the electric power printed circuit film 719. The driving circuit member 720 applies an electric power to the first light-emitting diodes 711 in the main mode and applies the electric power to the second light-emitting diode 717 in the sub mode. The driving circuit member 720 is electrically connected to the display panel 790.

Figure 18:
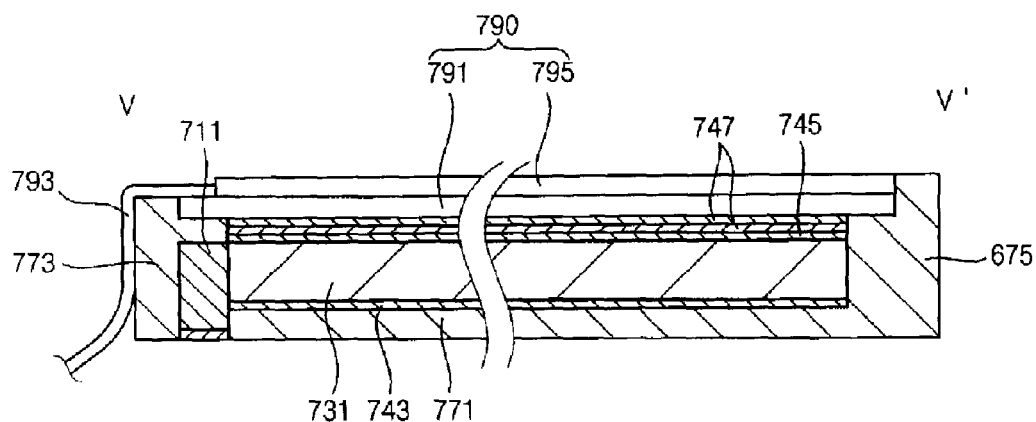
FIG. 18 is a cross-sectional view illustrating a display panel taken along line V-V' shown in FIG. 17.

FIG. 18 is a cross-sectional view illustrating the display panel taken along line V-V' shown in FIG. 17.

A receiving container of FIGS. 17 and 18 is substantially the same as in FIGS. 10 and 12 except for a partition wall, a first groove and a second groove. The receiving container of FIGS. 17 and 18 does not include the partition wall shown in FIGS. 10 and 12, and the receiving container of FIGS. 17 and 18 includes two first grooves on a first sidewall of the receiving container for receiving two first light emitting diodes and the second groove on a fourth sidewall of the receiving container for receiving the second light emitting diode. Thus, any further explanation concerning the above elements will be omitted.

Referring to FIGS. 17 and 18, the light guiding unit 730 includes a light guiding plate 731 and optical sheets 741.

The light guiding plate of FIGS. 17 and 18 is substantially the same as in FIG. 7, and the optical sheets of FIGS. 17 and 18 are substantially the same as in FIG. 13. Thus, any further explanation concerning the above elements will be omitted.

The optical sheets 741 include a reflecting sheet 743, a diffusion sheet 745 and a brightness enhancement sheet 747. The reflecting sheet 743, the diffusion sheet 745 and the brightness enhancement sheet 747 are received on a bottom plate 771 of the receiving container 770, in sequence.

The display panel 790 displays images based on the first and second lights generated from the backlight assembly 705. The display panel 790 includes a main display part MDP and a sub display part SDP.

The main display part MDP corresponds to a main region MD of a light exiting surface 737 of the light guiding plate 731, and the sub display part SDP corresponds to a sub region SS that is a remaining area of the light exiting surface 737 of the light guiding plate 731.

In a main mode, the display panel 790 displays main images on the main display part MDP and does not display sub images on the sub display part SDP. In a sub mode, the display panel 790 displays the sub images on the sub display part SDP and does not display the main images on the main display part MDP.

In the main mode, the first light generated from the first light-emitting diodes 711 of the backlight assembly 705 is incident into the main display part MDP. The display panel 790 changes a color of the first light to display the main images on the main display part MDP based on the first light generated from the first light-emitting diodes 711. The main images may include a moving image, a character, etc.

In the sub mode, the second light generated from the second light-emitting diode 717 of the backlight assembly 705 is incident into the sub display part SDP. The display panel 790 displays the sub images on the sub display part SDP based on the second light generated from the second light-emitting diode 717. The display panel 790 may not change a color of the second light to display the sub images. The sub images may include a time, a data, a battery state, etc.

Figure 19A:
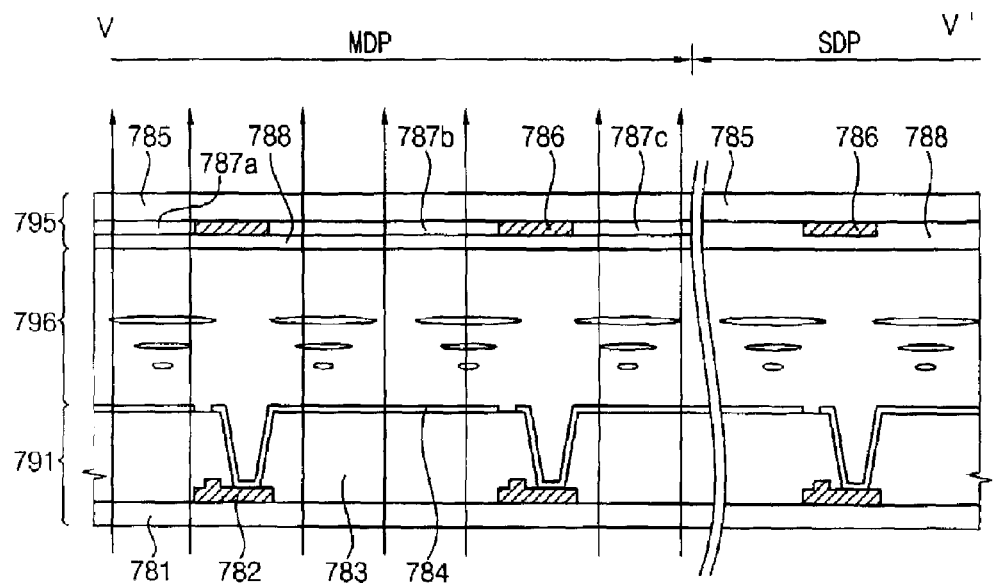
FIG. 19A is a cross-sectional view illustrating the display panel taken along line V-V' shown in FIG. 17 in a main driving mode.
Figure 19B:
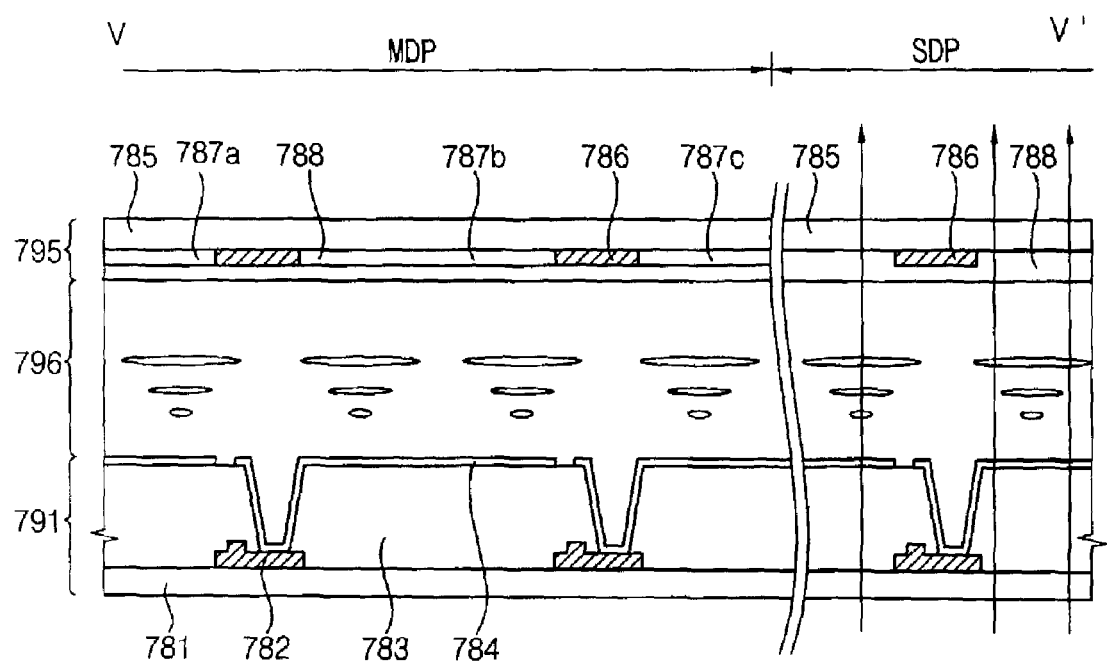
FIG. 19B is a cross-sectional view illustrating the display panel taken along line V-V' shown in FIG. 17 in a sub driving mode.

FIG. 19A is a cross-sectional view illustrating the display panel taken along line V-V' shown in FIG. 17 in a main mode. FIG. 19B is a cross-sectional view illustrating the display panel taken along line V-V' shown in FIG. 17 in a sub mode.

Referring to FIGS. 19A and 19B, the display panel 790 includes a first substrate 791, a second substrate 795 and a liquid crystal layer 796. The first substrate 791 includes a lower substrate 781, a switching element 782 and a pixel electrode 784. Alternative exemplary embodiments include configurations where the first substrate 791 may further include a plurality of switching elements and a plurality of pixel electrodes.

In one exemplary embodiment, the lower substrate 781 includes a transparent glass. A main pixel region and a sub pixel region are defined in the lower substrate 781. The main pixel region is substantially in parallel with the sub pixel region. A plurality of pixel regions is defined in the main and sub pixel regions in a matrix shape.

The switching element 782 is on each of the pixel regions to apply a main image signal or a sub image signal to a pixel electrode 784 at a predetermined timing.

The switching element 782 includes a source electrode SE, a drain electrode DE and a gate electrode GE. The main image signal or the sub image signal is applied to the source electrode. The main image signal or the sub image signal is outputted through the drain electrode DE. The switching element 782 is controlled by a gate signal applied to the gate electrode GE.

The switching element 782 may further include a gate insulating layer and a semiconductor layer. The gate insulating layer covers the gate electrode GE, so that the gate electrode GE is electrically insulated from the source and drain electrodes SE and DE. The semiconductor layer is on the gate insulating layer corresponding to the gate electrode GE, and is partially overlapped with the source and drain electrodes SE and DE.

The first substrate 791 may further include a protecting layer 783. The protecting layer 783 is on the lower substrate 781 to cover the switching element 782. A contact hole CT is formed on the protecting layer 783. The drain electrode DE of the switching element 782 is partially exposed through the contact hole CT.

The pixel electrode 784 includes a transparent conductive material. The pixel electrode is on the protecting layer 783 corresponding to each of the pixel regions. The pixel electrode 784 is electrically connected to the drain electrode DE through the contact hole CT. In exemplary embodiments, the transparent conductive material that may be used for the pixel electrode 784 are indium tin oxide (ITO), tin oxide (TO), indium zinc oxide (IZO), zinc oxide (ZO), amorphous indium tin oxide (a-ITO), indium tin-zinc oxide (ITZO), etc.

The second substrate 795 faces the first substrate 791. The second substrate 795 includes an upper substrate 785, a black matrix 786, color filters 787a, 787b and 787c and a common electrode 788.

The upper substrate 785 includes a transparent glass. A main color region and a sub color region are defined on the upper substrate 785. The main color region of the upper substrate 895 corresponds to the main pixel region of the lower substrate 781. The sub color region of the upper substrate 785 corresponds to the sub pixel region of the lower substrate 781.

The upper and lower substrates 785 and 781 may not include alkaline ions. When the upper and lower substrates 785 and 781 include the alkaline ions, the alkaline ions may be dissolved in the liquid crystal layer 796 and decrease a resistivity of liquid crystals of the liquid crystal layer 796, thereby deteriorating image display quality. In addition, an adhesive strength between a sealant and the glass substrate is decreased. Furthermore, the switching element 782 may be malfunctioned.

In exemplary embodiments, each of the upper and lower substrates 785 and 781 may also include triacetylcellulose (TAC), polycarbonate (PC), polyethersulfone (PES), polyethyleneterephthalate (PET), polyethylenenaphthalate (PEN), polyvinylalcohol (PVA), polymethylmethacrylate (PMMA), cyclo-olefin polymer (COP), etc. These can be used alone or in combination thereof.

In other exemplary embodiments, each of the upper and lower substrates 785 and 781 may be optically isotropic.

The black matrix 786 blocks a portion of the light incident into a region in which the liquid crystals are uncontrollable. In particular, the black matrix 786 is between the unit pixel regions that are formed in the main pixel region and in the sub pixel region and arranged in a matrix shape on the upper substrate 785.

In exemplary embodiments, a metal composition, an opaque organic material, etc., may be formed on the upper substrate 785 and partially removed to form the black matrix 786. In one exemplary embodiment, the metal includes chromium. In another exemplary embodiment the metal composition may include chromium oxide, chromium nitride, etc. In another exemplary embodiments the opaque organic material may include carbon black, a pigment mixture, a colorant mixture, etc. The pigment mixture may include red, green and blue pigments. The colorant mixture may include red, green and blue pigments. In another exemplary embodiment, the metal or the metal composition is deposited on the upper substrate 785 and then partially etched to form the black matrix 786.

Alternative embodiments include configurations where a photoresist layer including the opaque organic material is coated on the upper substrate 785 and then patterned through a photo process to form the black matrix 786.

Each of the color filters 787a, 787b and 787c transmits a color light having a predetermined wavelength. In FIGS. 19A and 19B, the color filters 787a, 787b and 787c may only be in the main color region. In particular, the color filters 787a, 787b and 787c are in the regions defined by the black matrix 786. The color filters 787a, 787b and 787c may include a red color filter portion 787a, a green color filter portion 787b and a blue color filter portion 787c. The red, green and blue color filter portions 787a, 787b and 787c correspond to the pixel regions of the lower substrate 781, respectively.

Alternative embodiments include configurations where end portions of the red, green and blue color filter portions 787a, 787b and 787c may be partially overlapped to form the black matrix 786.

The color filters 787a, 787b and 787c may include a photo initiator, a monomer, a binder, a colorant, a dispersing agent, a solvent, a photoresist, etc. Alternatively, the color filters 787a, 787b and 787c corresponding to the main pixel region may be on a passivation layer 723 that is on the lower substrate 781 to cover the switching element 782.

In FIG. 19A, in the main mode, the first light passes through the red color filter portion 787a, the green color filter portion 787b or the blue color filter portion 787c of the main display part MDP to convert a white light into a red light, a green light or a blue light.

In FIG. 19B, in the sub mode, the color filters 787a, 787b and 787c are not formed on the sub display part SDP, so that the sub image is displayed on the sub display part SDP using the second light. The second light does not pass through the color filters 787a, 787b and 787c, thereby increasing a luminance of the sub display part SDP.

The common electrode 788 is on an entire of the upper substrate 785 having the black matrix 786 and the color filters 787a, 787b and 787c. In exemplary embodiments, the common electrode 788 may include a transparent conductive material. The transparent conductive material may include indium tin oxide (ITO), tin oxide (TO), indium zinc oxide (IZO), zinc oxide (ZO), amorphous indium tin oxide (a-ITO), indium tin-zinc oxide (ITZO), etc. Alternative embodiments include configurations where the common electrode 788 may be formed on the lower substrate 781 with the pixel electrode 784.

In other exemplary embodiments, the display panel 790 may further include a spacer (not shown). The spacer (not shown) is formed on the upper substrate 785 having the black matrix 786, the color filters 787a, 787b and 787c and the common electrode 788. The first substrate 791 is spaced apart from the second substrate 795 by a substantially constant distance.

The liquid crystal layer 796 is interposed between the first and second substrates 791 and 795 and sealed by the sealant (not shown). In exemplary embodiments, the liquid crystal 796 may be aligned in a twisted nematic (TN) mode.

In alternative exemplary embodiments, liquid crystals of the liquid crystal layer 796 may be aligned in a vertically aligned (VA) mode, a mixed twisted nematic (MTN) mode, a homogeneous mode, etc.

The first and second substrates 791 and 795 may further include alignment layers (not shown), respectively, to align the liquid crystal layer 796. In addition, the first substrate 791 may further include a storage capacitor (not shown).

The storage capacitor (not shown) is formed on the lower substrate 781 to maintain a voltage difference between the common electrode 788 and the pixel electrode 784.

The display panel 790 may further include a panel printed circuit film 793. The panel printed circuit film 793 applies a driving signal to the display panel 790. The panel printed circuit film 793 is electrically connected to an end portion of the first substrate 791.

The receiving container 770 may include first sidewall 773, second sidewall 775, third sidewall 777 and fourth sidewall 779. The panel printed circuit film 793 is bent and surrounds the first sidewall 773 of the receiving container 770 along a first guiding groove. A first terminal of the panel printed circuit film 793 is electrically connected to a driving circuit member 720. A second terminal of the panel printed circuit film 793 is aligned along a second guiding groove of the first sidewall 773 to be electrically connected to the electric power printed circuit film 719.

When a voltage difference is applied to the pixel electrode 784 and the common electrode 788, an electric field is formed between the pixel electrode 784 and the common electrode 788. Liquid crystals of the liquid crystal layer 796 vary arrangements in response to the electric field applied thereto.

Therefore, a light transmittance of the liquid crystal layer 796 corresponding to the main display part MDP or the sub display part SDP is changed, so that the display panel 790 displays images.

Particularly, in the main mode, the display panel 790 controls the light transmittance of the first light that is the white light using the liquid crystal layer 796 in the main display part MDP. The color filters 787a, 787b and 787c that are on the main display part MDP change a color of the first light, thereby displaying main images on the main display part MDP.

In the sub mode, the display panel 790 controls the light transmittance of the second light that is one of the red, green and blue lights using the liquid crystal layer 796 in the sub display part SDP. The color filters 787a, 787b and 787c are not on the sub display part MDP, so that a color of the second light is not changed, thereby displaying sub images on the sub display part MDP.

Figure 20:
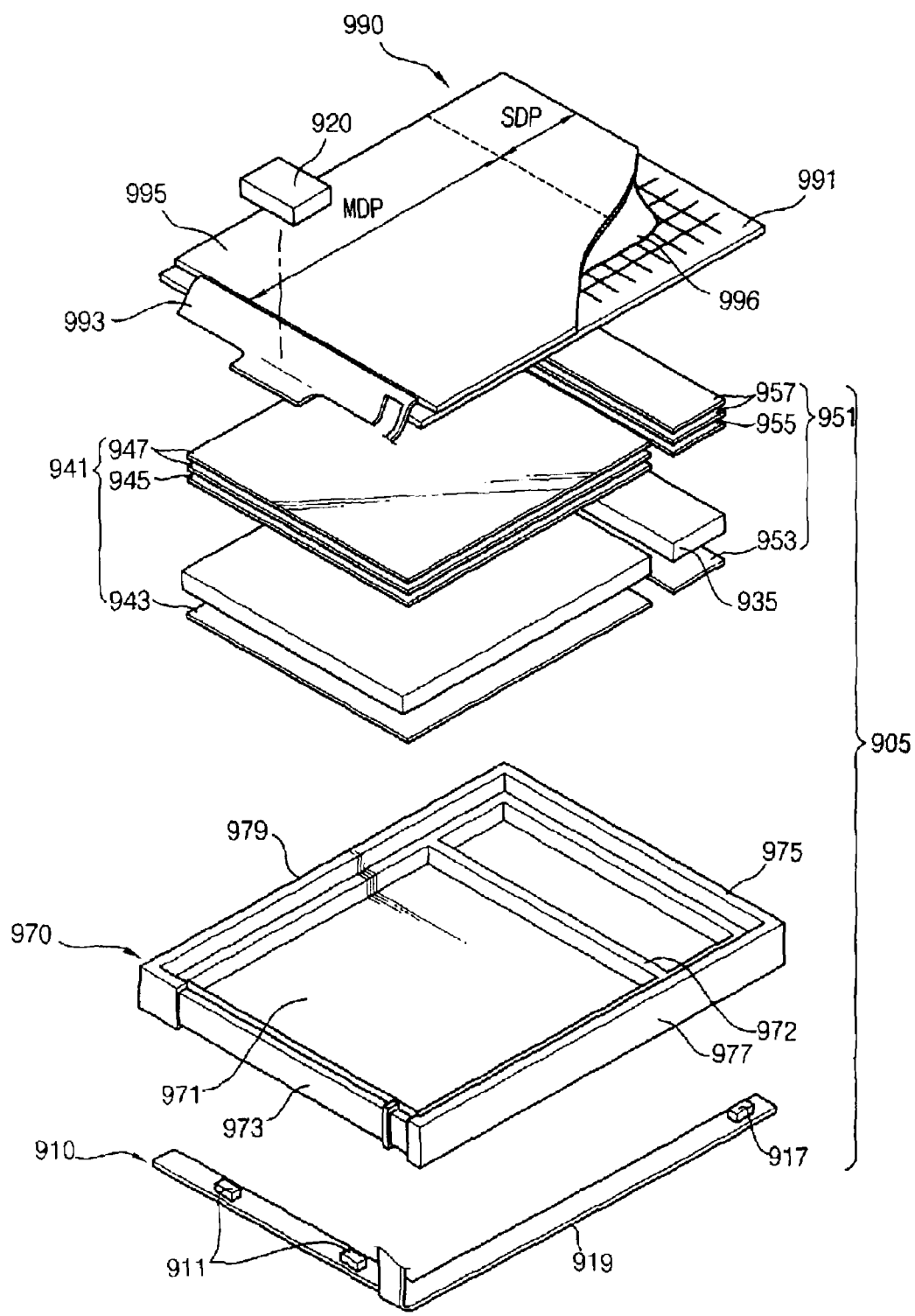
FIG. 20 is an exploded perspective view illustrating another exemplary embodiment of a display device in accordance with the present invention.

FIG. 20 is an exploded perspective view illustrating another exemplary embodiment of a display device in accordance with the present invention.

Referring to FIG. 20, the display device 900 includes a backlight assembly 905 and a display panel 990.

The backlight assembly of FIG. 20 has substantially the same as in FIGS. 10 to 12 except for a light source unit and a receiving container, and thus any further explanation concerning the above elements will be omitted.

The light source unit of FIG. 20 has substantially the same as in FIG. 17 except for an operation, and thus any further explanation concerning the above elements will be omitted. The light source unit of FIG. 20 is operated through a substantially same method as in FIGS. 10 to 12. First light-emitting diodes 911 generate a white light in a main mode and do not generate the white light in a sub mode. A second light-emitting diode 917 generates one of the red, green and blue lights in the main mode and the sub mode. Therefore, the display device 900 displays a sub image in the main mode and the sub mode.

The backlight assembly 905 includes a light source unit 910, a driving circuit member 920, a light guiding unit 930 and a receiving container 970. The display panel 990 includes a first substrate 991, a second substrate 995 and a liquid crystal layer 996.

The light guiding unit 930 includes a main light guiding plate 931 a sub light guiding plate 935 and optical sheets. The main light guiding plate 931 is received in a main receiving region of the receiving container 970 and the sub light guiding plate 935 is received in a sub receiving region of the receiving container 970. The main light guiding plate 931 is substantially in parallel with the sub light guiding plate 935.

The main light guiding plate 931 guides the first light that is incident into the main light guiding plate 931 through a side surface facing the first sidewall 973 toward an upper portion of the backlight assembly 905. The sub light guiding plate 935 guides the second light that is incident into the sub light guiding plate 935 through a side surface facing the second sidewall 975 toward the upper portion of the backlight assembly 905.

The partition wall 972 is interposed between the main light guiding plate 931 and the sub light guiding plate 935, so that the main light guiding plate 931 is optically isolated from the sub light guiding plate 935.

The optical sheets include main optical sheets 941 and sub optical sheets 951. The main optical sheets 941 improve optical characteristics of the first light exiting the main light guiding plate 931. The main optical sheets 941 include a main reflecting sheet 943, a main diffusion sheet 945 and a main brightness enhancement sheet 947. The sub optical sheets 951 improve optical characteristics of the second light exiting the sub light guiding plate 951. The sub optical sheets 951 include a sub reflecting sheet 953, a sub diffusion sheet 955 and a sub brightness enhancement sheet 957.

Two first recesses (not shown) are formed on the first sidewall 973 of the receiving container 970, and two holes (not shown) are formed through a peripheral portion of a bottom plate 971 of the receiving container 970 corresponding to the first recesses (not shown). A second recess (not shown) is formed on a second sidewall 975, and a hole is formed through a peripheral portion of the bottom plate 971 corresponding to the second recess (not shown). The receiving container of FIG. 20 is substantially the same as in FIGS. 10 to 12 except the first recesses and the holes. The first light-emitting diodes 911 are received in the first recesses (not shown) of the first sidewall 973 through the holes (not shown) of the bottom plate 971 corresponding to the first recesses (not shown), respectively. The second light-emitting diode 917 is received in the second recess (not shown) of the second sidewall 975 through the hole of the bottom plate 971 corresponding to the second recess (not shown).

The receiving container 970 may include first sidewall 973, second sidewall 975, third sidewall 977 and fourth sidewall 979. The panel printed circuit film 993 is bent and surrounds the first sidewall 973 of the receiving container 970 along a first guiding groove. A first terminal of the panel printed circuit film 993 is electrically connected to a driving circuit member 920. A second terminal of the panel printed circuit film 993 is aligned along a second guiding groove of the first sidewall 973 to be electrically connected to the electric power printed circuit film 919.

The receiving container 970 may further include a partition wall 972 between the sub display part SDP and the main display part MDP, so that the sub display part SDP is optically isolated from the main display part MDP.

The display panel 990 of FIG. 20 is substantially the same as in FIGS. 17 to 19B, and thus any further explanation concerning the above elements will be omitted.

Figure 21:
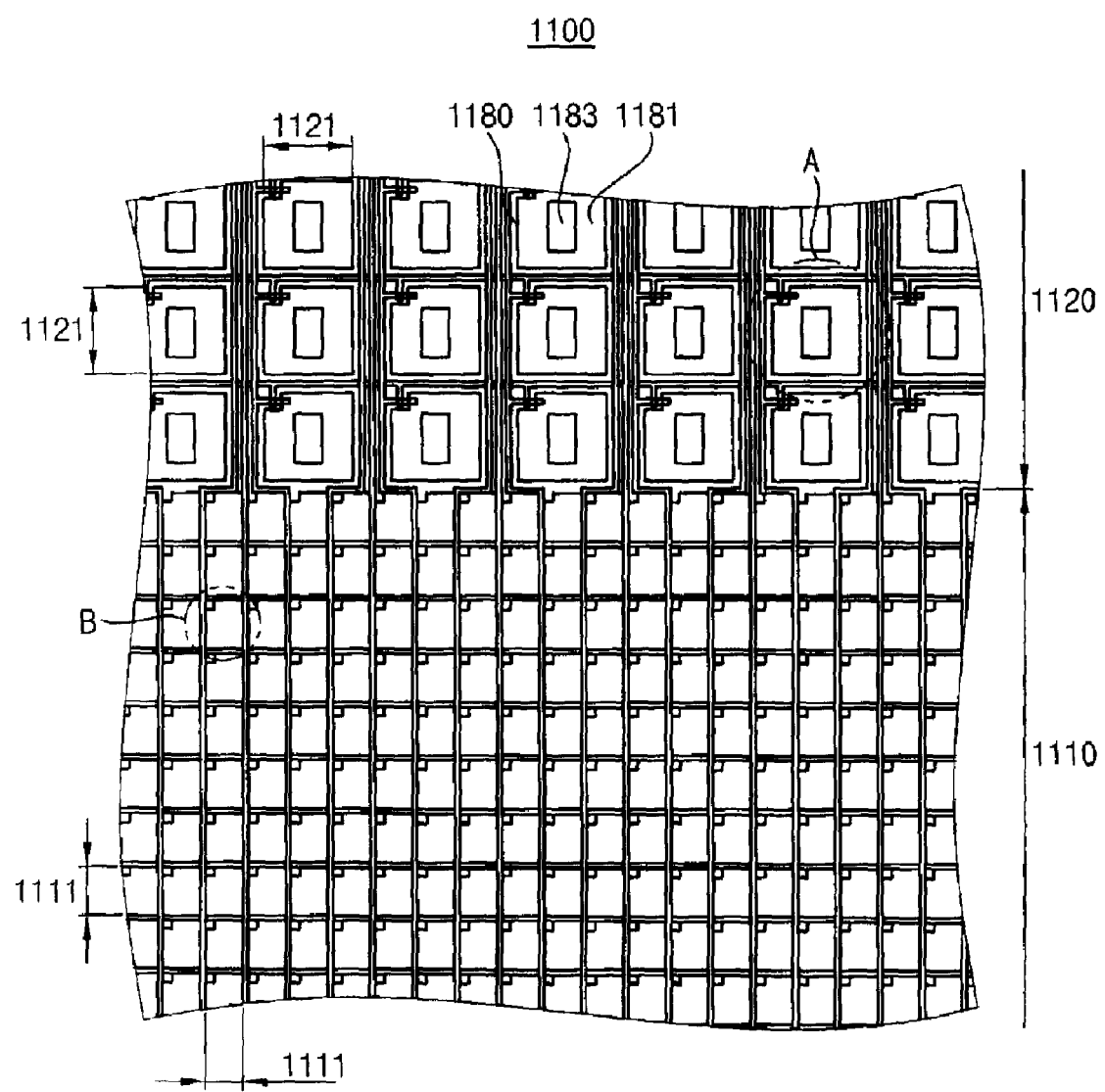
FIG. 21 is a plan view illustrating an exemplary embodiment of a display substrate in accordance with the present invention.
Figure 22:
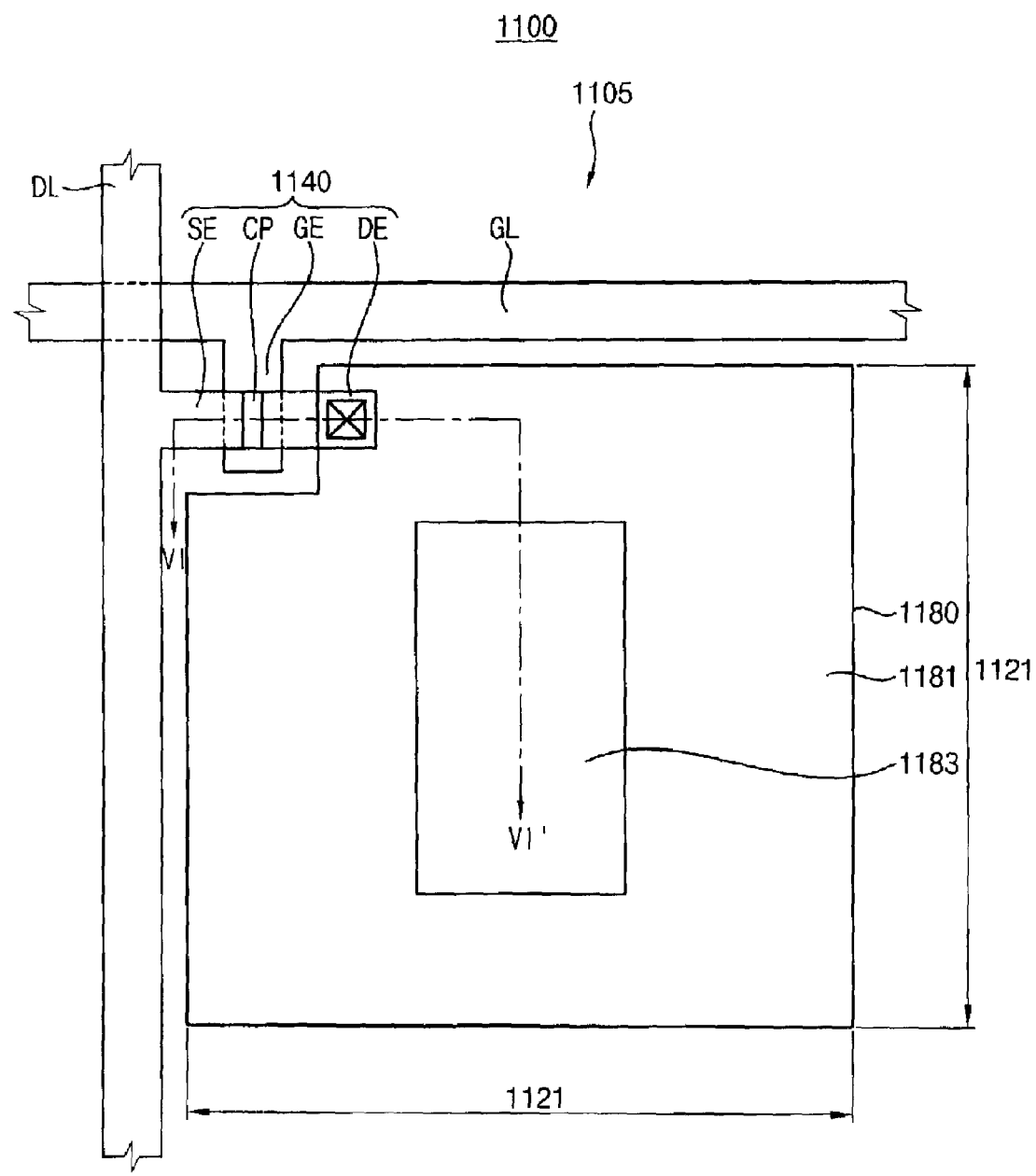
FIG. 22 is an enlarged plan view illustrating portion 'A' shown in FIG. 21.
Figure 22:
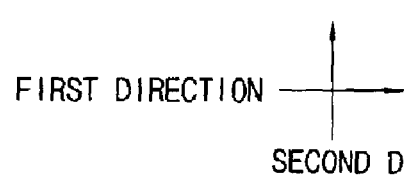

FIG. 21 is a plan view illustrating an exemplary embodiment of a display substrate in accordance with the present invention. FIG. 22 is an enlarged plan view illustrating portion 'A' shown in FIG. 21.

Referring to FIGS. 21 and 22, the display substrate 1100 includes a base substrate 1105, a switching element 1140 and a reflecting plate 1180. In alternative exemplary embodiments, the display substrate 1100 may further include a plurality of switching elements. The display substrate 1100 may be used for a display device having a main display part and a sub display part.

The base substrate 1105 may include a transparent glass substrate. The base substrate 1105 includes a main driving region 1110 corresponding to the main display part and a sub driving region 1120 corresponding to the sub display part. The main driving region 1110 is substantially in parallel with the sub driving region 1120 to divide the base substrate 1105. A plurality of pixel regions 1111 and 1121 are in the main driving region 1110 and the sub driving region 1120 in a substantially matrix shape.

Figure 23:
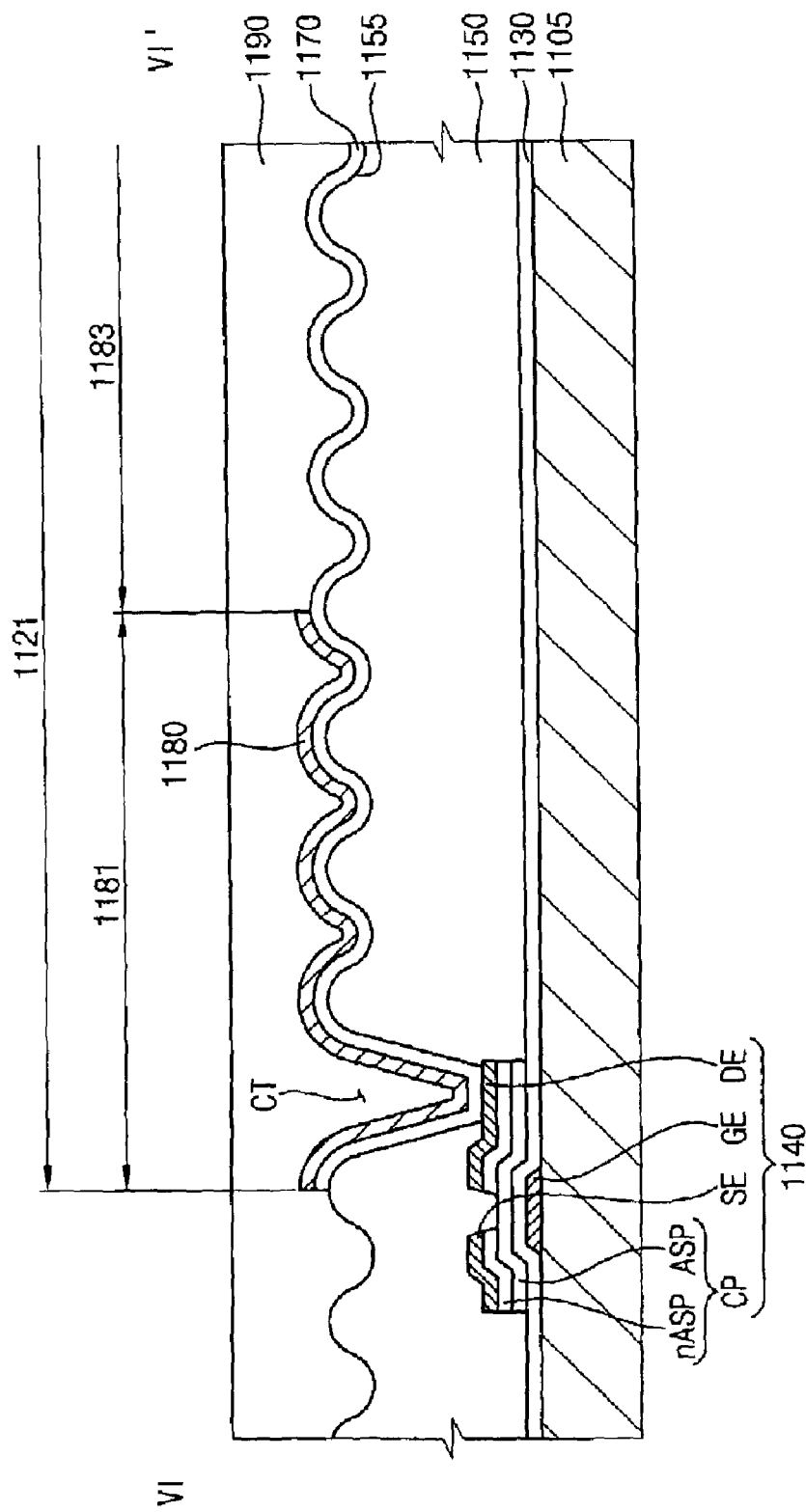
FIG. 23 is a cross-sectional view taken along line VI-VI' shown in FIG. 22.

FIG. 23 is a cross-sectional view taken along line VI-VI' shown in FIG. 22.

Referring to FIGS. 21 to 23, the switching element 1140 is on the base substrate 1105 and applies an externally provided data signal to a transparent electrode 1170.

The switching element 1140 includes a gate electrode GE electrically connected to a gate line GL, a gate insulating layer 1130, a channel pattern CP, a source electrode SE electrically connected to a data line DL and drain electrode DE. The display substrate 1100 may further include a plurality of switching elements, a plurality of gate lines and a plurality of data lines.

The gate lines GL are extended in a first direction. The gate lines GL in the main driving region 1110 are spaced apart from each other by a first distance. The gate lines GL in the sub driving region 1120 are spaced apart from each other by a second distance that is greater than the first distance. The gate electrode GE is protruded from one of the gate lines GL in a second direction that is substantially in perpendicular to the first direction.

The gate insulating layer 1130 covers the gate electrode GE and the gate lines GL, so that the gate electrode GE and the gate lines GL are electrically insulated from the source electrode SE and the data lines DL. In one exemplary embodiment, the gate insulating layer 1130 may be a silicon nitride layer.

The channel pattern CP is on the gate insulating layer 1130 corresponding to the gate electrode GE. The channel pattern CP may include an amorphous silicon pattern ASP and an N+ amorphous silicon pattern nASP. In FIG. 23, two N+amorphous silicon patterns nASP that are spaced apart from each other are on the amorphous silicon pattern ASP.

The data lines DL are on the gate insulating layer 1130. The data lines DL are extended in the second direction and are substantially in parallel with each other. The pixel regions 1111 and 1121 are defined by the gate and data lines GL and DL adjacent to each other.

The data lines DL are spaced apart from each other by a third distance in the main driving region 1110. Every three data lines DL adjacent to each other in the sub driving region 1120 form a plurality of a data line assembly in the sub driving region 1120. That is, each of the data line assembly includes the three data lines DL adjacent to each other. The data line assemblies are spaced apart from each other by a fourth distance in the sub driving region 1120. Therefore, the pixel regions 1121 in the sub driving region 1120 have a greater area than the pixel regions 1111 in the main driving region 1110, so that the main driving region 1110 has a greater resolution than the sub driving region 1120.

The source electrode SE is protruded from one of the data lines DL in a first direction. The source electrode SE is on one of the N+ amorphous silicon pattern to be electrically connected to the one of the N+ amorphous silicon pattern.

The drain electrode DE is on another of the N+ amorphous silicon pattern to be electrically connected to the another of the N+ amorphous silicon pattern. The drain electrode DE may be formed from a substantially the same layer as the data lines DL.

Figure 24:
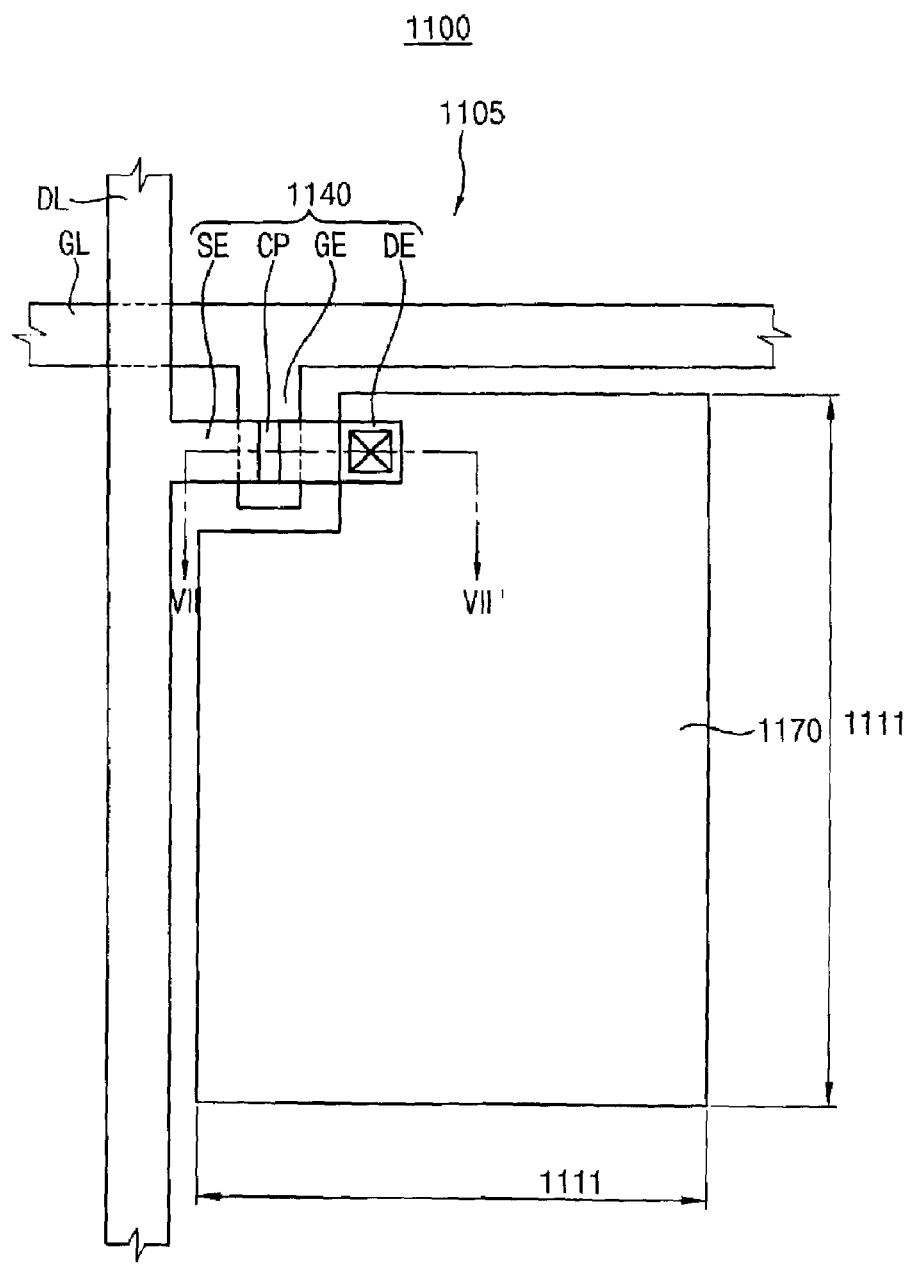
FIG. 24 is an enlarged plan view illustrating portion 'B' shown in FIG. 21.
Figure 25:
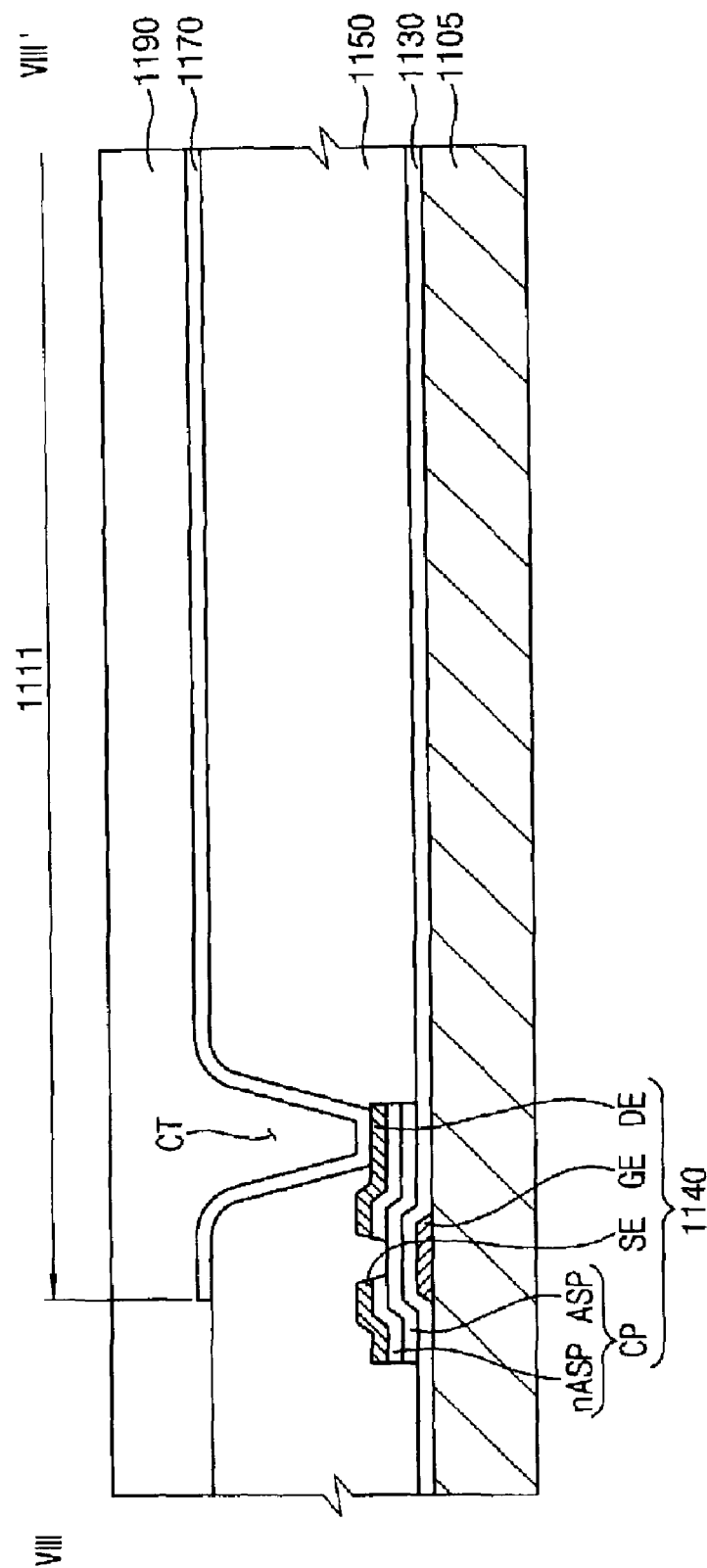
FIG. 25 is a cross-sectional view taken along line VII-VII' shown in FIG. 24.

FIG. 24 is an enlarged plan view illustrating portion 'B' shown in FIG. 21. FIG. 25 is a cross-sectional view taken along line VII-VII' shown in FIG. 24.

Referring to FIGS. 21 to 25, the display substrate 1100 may further include an insulating pattern 1150 and a transparent electrode 1170.

The insulating pattern 1150 is on the base substrate 1105 to cover the switching element 1140. The insulating pattern 1150 includes a contact hole CT through which the drain electrode DE of the switching element 1140 is partially exposed. In one exemplary embodiment, the insulating pattern 1150 may include a photoresist material for forming the contact hole CT.

An embossing pattern 1155 may be formed on an upper surface of the insulating pattern 1150 in the sub driving region 1120. The upper surface of the insulating pattern 1150 in the main driving region 1110 may have a substantially flat shape.

The transparent electrode 1170 includes a transparent conductive material. The transparent electrode 1170 corresponds to each of the pixel regions. The transparent electrode 1170 is electrically connected to the drain electrode DE through the contact hole CT of the insulating pattern 1150. In exemplary embodiments, transparent conductive material that can be used for the transparent electrode 1170 may include indium tin oxide (ITO), tin oxide (TO), indium zinc oxide (IZO), zinc oxide (ZO), amorphous indium tin oxide (a-ITO), indium tin zinc oxide (ITZO), etc.

The reflecting plate 1180 includes a highly reflective material. In exemplary embodiments, the highly reflective material that can be used for the reflecting plate 1180 may include aluminum, niobium, etc. In FIGS. 21 to 25, the reflecting plate 1180 is in each of the pixel regions of the sub driving region 1120.

The reflecting plate 1180 is on the transparent electrode 1170, and electrically connected to the transparent electrode 1170 to form the reflection electrode. The reflecting plate 1180 is on the embossed pattern 1155 that is formed on the insulating pattern 1150 in the sub driving region. The reflecting plate 1180 is on the embossing pattern 1155 to increase a luminance when viewed on a plane.

The reflecting plate 1180 has an opening on a central portion of the reflecting plate 1180 to divide each of the pixel regions 1121 into a reflection portion 1181 and a transmission portion 1183. An externally provided light is reflected from the reflecting plate 1180 of the reflection portion 1181. An internally provided light may pass through the transmission portion 1183. In FIGS. 21 to 25, the transmission portion 1183 is on a central portion of each of the pixel regions 1121. Alternative exemplary embodiments include configurations where the location of the transmission portion 1183 may be changed. In one exemplary embodiment, the transmission portion 1183 may be on a corner of each of the pixel regions 1121.

In FIGS. 21 to 25, in the main driving region 1110, the reflecting plate 1180 is not formed on the transmission electrode 1170 and the transmission electrode 1170 is in each of the pixel regions 1111.

Referring again to FIGS. 23 and 25, the display substrate 1100 may further include an alignment layer 1190. The alignment layer 1190 is disposed on the transmission electrode 1170 and the reflecting plate 1180. In exemplary embodiments, the alignment layer 1190 includes a polyimide resin. A plurality of alignment grooves may be formed on the alignment layer 1190 to align the liquid crystals of the liquid crystal layer.

Figure 26:
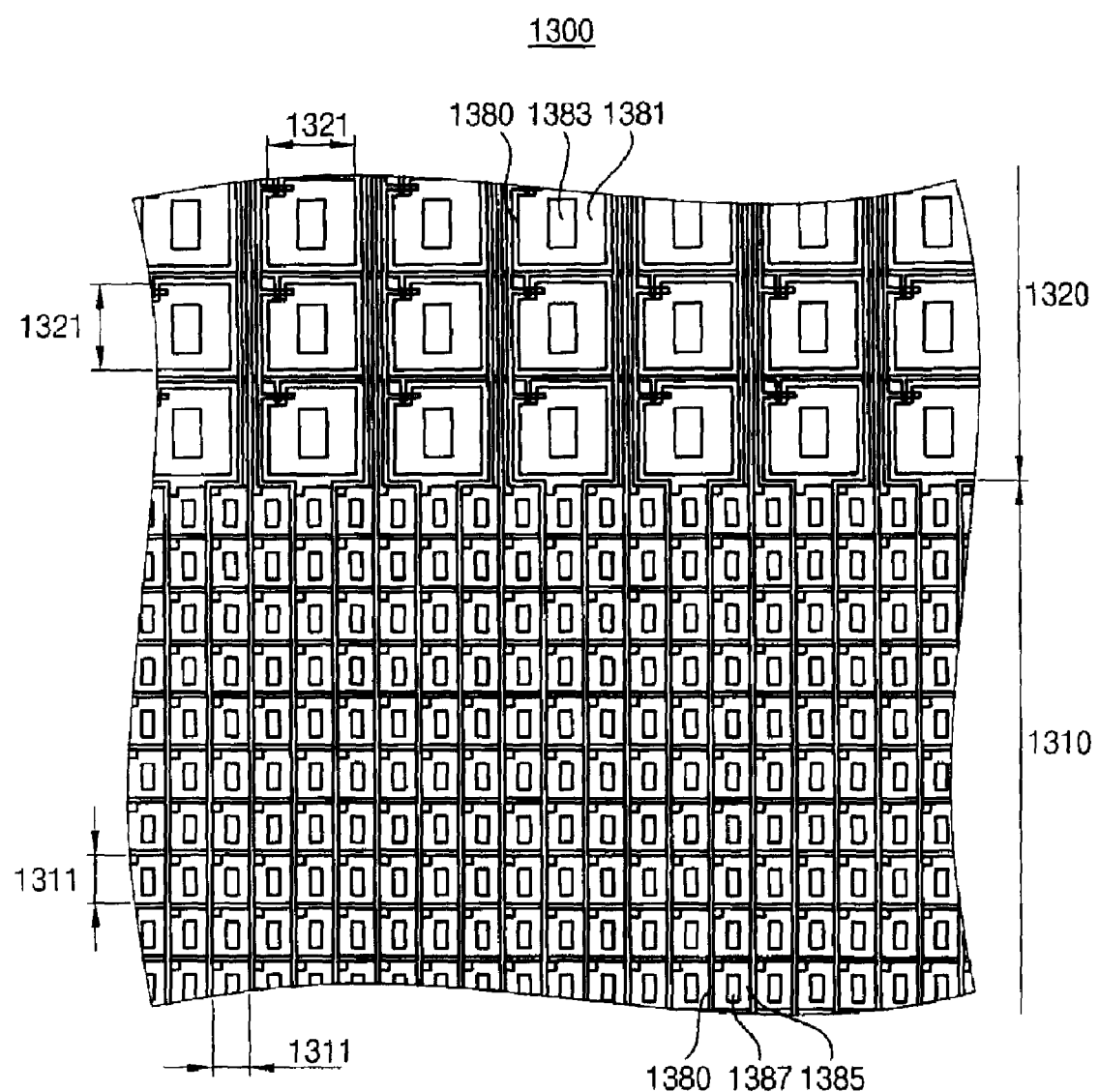
FIG. 26 is a plan view illustrating another exemplary embodiment of a display substrate in accordance with the present invention.

FIG. 26 is a plan view illustrating another exemplary embodiment of a display substrate in accordance with the present invention.

The display device of FIG. 26 is substantially the same as in FIGS. 21 to 25 except for an insulating pattern and a reflecting plate. Thus, any further explanation concerning the above elements will be omitted.

Referring to FIG. 26, the display device 1300 includes a base substrate 1305, a switching element 1340, an insulating pattern 1350, a transparent electrode 1370, a reflecting plate 1380 and an alignment layer 1390. Alternative exemplary embodiments include configurations where the display 1300 further includes a plurality of switching elements 1340, a plurality of transparent electrodes 1370 and a plurality of reflecting plates 1380.

The insulating pattern 1350 is on the base substrate 1305 having the switching element 1340. An embossing pattern 1355 is formed on the insulating pattern 1350 corresponding to pixel regions 1311 in a main driving region 1310 and pixel regions 1321 in a sub driving region 1320.

The reflecting plate 1380 is on each of the pixel regions 1311 and 1321. Each of the pixel regions 1311 in the main driving region 1310 is divided into a reflection portion 1385 and a transmission region 1387. Each of the pixel regions 1321 in the sub driving region 1320 is divided into a reflection portion 1381 and a transmission region 1383. Therefore, each of the main driving region 1310 and the sub driving region 1320 is considered including a reflective-transmissive mode.

Figure 27:
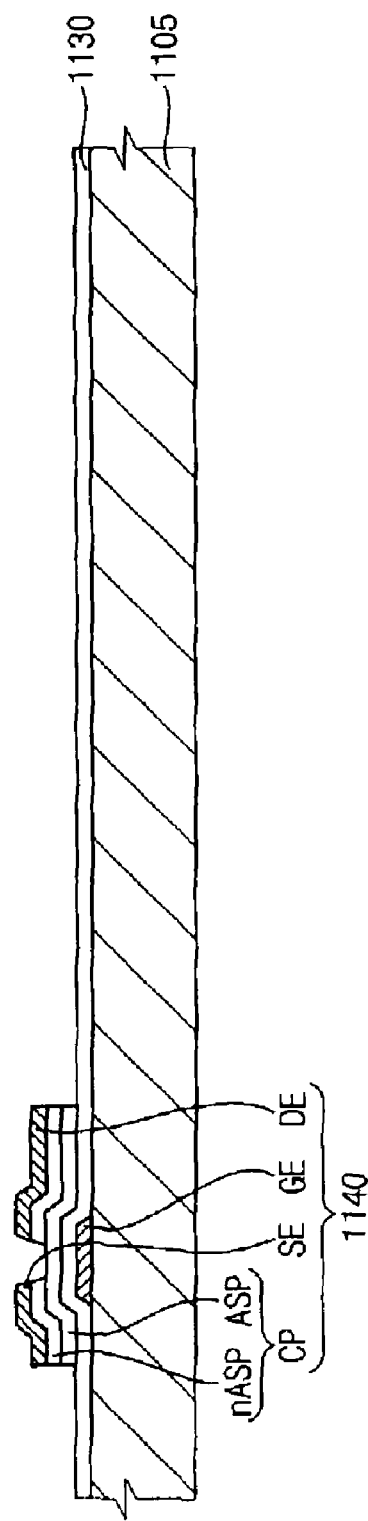
FIGS. 27 to 29 are cross-sectional views illustrating an exemplary embodiment of a method of manufacturing an array substrate in accordance with the present invention.
Figure 28:
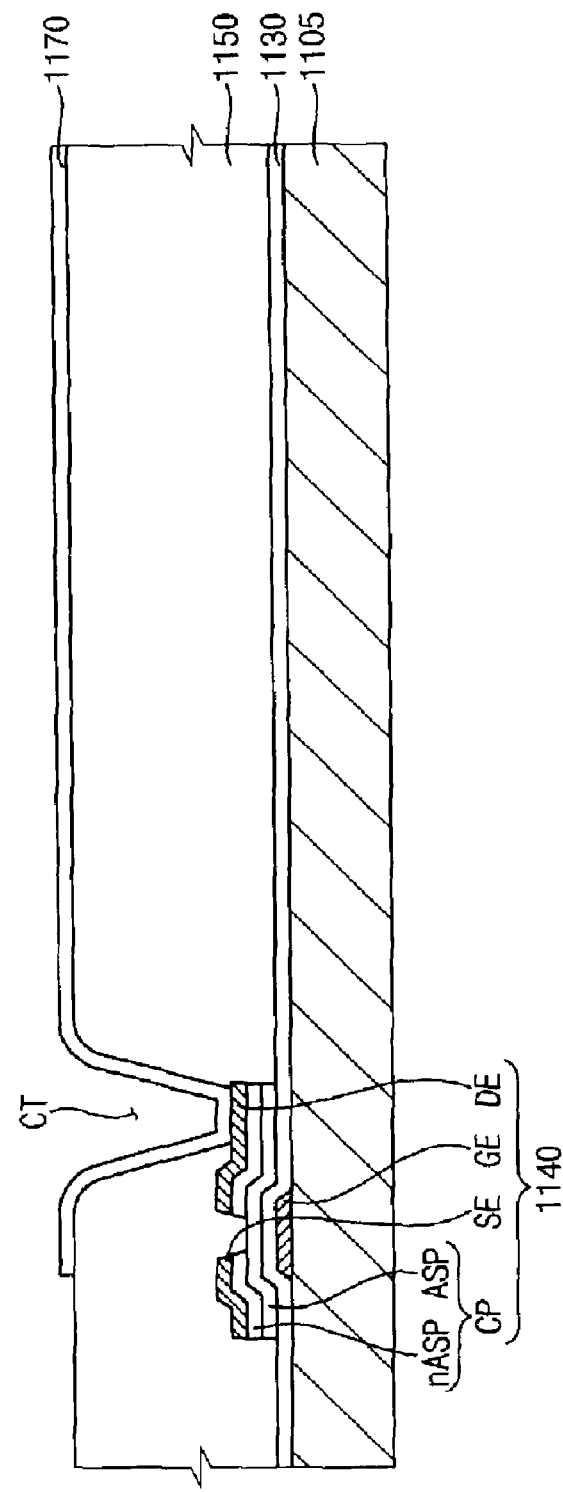
Figure 29:
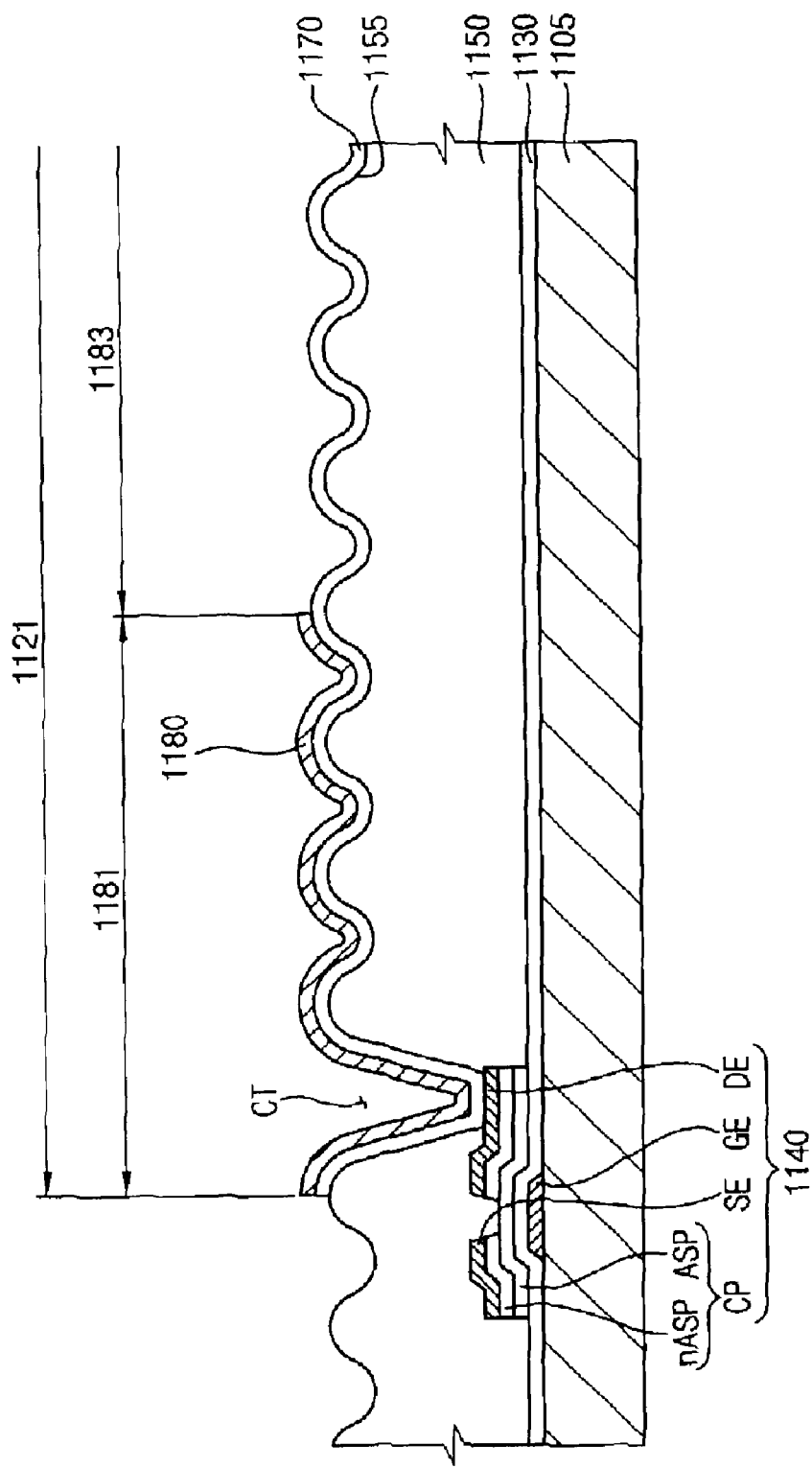

FIGS. 27 to 29 are cross-sectional views illustrating an exemplary embodiment of a method of manufacturing an array substrate in accordance with the present invention.

The display substrate of FIGS. 27 to 29 is substantially the same as in FIGS. 21 to 25. Thus, the same reference numerals will be used to refer to the same or like parts as those described in FIGS. 21 to 25 and any further explanation concerning the above elements will be omitted.

Referring to FIG. 27, in order to manufacture the display substrate 1100, a switching element 1140 is formed on a base substrate 1105 having a main driving region 1110 and a sub driving region 1120.

In one exemplary embodiment, the switching element 1140 is manufactured by a gate metal layer being formed on the base substrate 1105 through a chemical vapor deposition (CVD) process and a sputtering process. The gate metal layer is patterned to form a gate line GL and a gate electrode GE that is electrically connected to the gate line GL.

A gate insulating layer 1130 is formed on the base substrate 1105 having the gate line GL and the gate electrode GE through a CVD process. In one exemplary embodiment, the gate insulating layer 1130 may include silicon nitride.

An amorphous silicon layer, an N+ amorphous silicon layer and a source/drain layer are formed on the gate insulating layer 1130, in sequence. In one exemplary embodiment, impurities are implanted in an upper portion of the amorphous silicon layer at a high concentration to form the N+ amorphous silicon layer.

The source/drain layer is patterned to form a source electrode SE, a data line DL and a drain electrode DE. The source electrode SE is electrically connected to the data line DL. The drain electrode DE is spaced apart from the source electrode SE.

The amorphous silicon layer and the N+ amorphous silicon layer are patterned using the source electrode SE, the data line DL and the drain electrode DE as an etching mask to form an N+ amorphous silicon patterns nASP and an amorphous silicon pattern ASP, thereby forming a channel pattern CP having the N+ amorphous silicon patterns nASP and the amorphous silicon pattern ASP.

FIG. 28 is a cross-sectional view illustrating an exemplary embodiment of a display substrate in a main driving region. FIG. 28 is a cross-sectional view illustrating an exemplary embodiment of a display substrate in a sub driving region.

Referring to FIGS. 28 and 29, a protecting layer is formed on the base substrate 1105 having the channel pattern CP, the source electrode SE, the data line DL and the drain electrode DE. The protecting layer may include a photoresist layer having an organic material. The protecting layer is patterned to form a contact hole CT, thereby forming an insulating pattern 1150.

The contact hole CT is formed in the insulating pattern 1150. The drain electrode DE of the switching element 1140 is partially exposed through the contact hole CT. In FIG. 28, an upper surface of the insulating pattern 1150 in the main driving region 1110 may have a substantially flat shape. In FIG. 29, an upper surface of the insulating pattern 1150 in the sub driving region 1120 may have an embossed pattern 1155.

A transparent conductive layer is formed on an entire of the insulating pattern 1150 of the main and sub driving regions 1110 and 1120. A highly reflective layer having a highly reflective metal or a highly reflective alloy is deposited on the transparent conductive layer in the sub driving region 1120. Exemplary embodiments of the highly reflective metal that can be used for the highly reflective layer include aluminum, neodymium, etc. Alternative exemplary embodiments include the transparent conductive layer that may be formed on the highly reflective layer having the aluminum.

The transparent conductive layer and the highly reflective layer that are on the insulating pattern 1150 are patterned to form a transparent electrode 1170 and a reflecting plate 1180. The transparent electrode 1170 is electrically connected to the drain electrode DE. The reflecting plate divides each of pixel regions in the sub driving region 1120 into a reflection portion 1181 and a transmission portion 1183.

Figure 30:
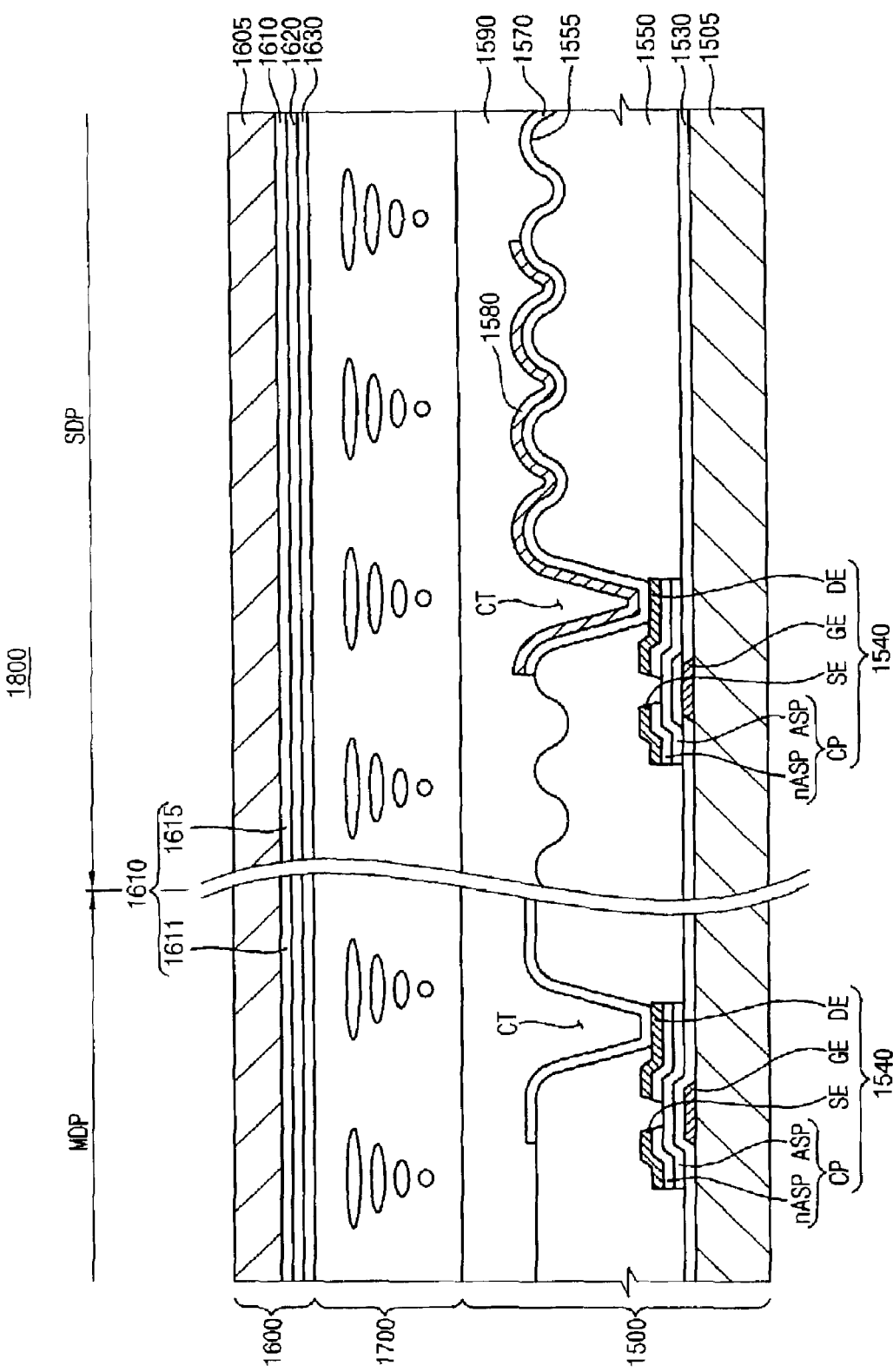
FIG. 30 is a cross-sectional view illustrating another exemplary embodiment of a display device in accordance with the present invention.

FIG. 30 is a cross-sectional view illustrating another exemplary embodiment of a display device in accordance with the present invention.

Referring to FIG. 30, the display device 1800 includes a display substrate 1500, an opposite substrate 1600 and a liquid crystal layer 1700.

The display device 1800 includes a main display part MDP and a sub display part SDP. The main and sub display parts MDP and SDP display main images and sub images in a main mode, respectively. The sub display part SDP displays the sub images in a sub mode. The main images may include a moving image, a character, etc. The sub display part SDP displays the sub images using an externally provided light and/or an internally provided light. When the externally provided light is not sufficient, the sub display part SDP displays the sub images using the internally provided light. When the externally provided light is sufficient, the sub display part SDP displays the sub images using the externally provided light. The sub images may include a time, a data, a battery state, etc.

The display substrate 1500 includes a first substrate 1505, a switching element 1540, an insulating pattern 1550, a transparent electrode 1570, a reflecting plate 1580 and a first alignment layer 1590. An upper surface of the insulating pattern 1550 in the main driving region MDP may have a substantially flat shape. An upper surface of the insulating pattern 1550 in the sub driving region SDP may have an embossed pattern 1555.

The first substrate 1505 includes a main driving region corresponding to the main display part MDP and a sub driving region corresponding to the sub display part SDP. The display substrate of FIG. 30 is substantially the same as in FIGS. 1 to 5, and thus any further explanation concerning the above elements will be omitted.

The opposite substrate 1600 faces the display substrate 1500. The opposite substrate 1600 includes a second substrate 1605, a color filter 1610, a common electrode 1620 and a second alignment layer 1630.

The color filter 1610 is on the second substrate 1605. The color filter 1610 corresponds to pixel regions of the display substrate, such as pixel regions 111 and 1121 of display substrate 1100 in FIG. 21. The color filter 1610 includes a main color filter 1611 and a sub color filter 1615. In an exemplary embodiment, the main color filter 1611 corresponds to pixel regions 1111 in the main driving region (See, FIG. 21). The sub color filter 1615 corresponds to pixel regions 1121 in the sub driving region (See, FIG. 21). The color filter 1610 may include, but is not limited to, red, green and blue color filters that transmit red, green and blue lights, respectively.

The common electrode 1620 covers the color filter 1610. The common electrode 1620 may include a transparent conductive material. In exemplary embodiments, the transparent conductive material that can be used for the common electrode 1620 include, but are not limited to, indium tin oxide (ITO), tin oxide (TO), indium zinc oxide (IZO), zinc oxide (ZO), amorphous indium tin oxide (a-ITO), indium tin-zinc oxide (ITZO), etc. The common electrode 1620, the transparent electrode 1570 of the display substrate 1500 and the liquid crystal layer 1700 form a liquid crystal capacitor. The common electrode 1620, the reflecting plate 1580 of the display substrate 1500 and the liquid crystal layer 1700 may also form a liquid crystal capacitor.

The second alignment layer 1630 covers the common electrode 1620 and includes a plurality of alignment grooves (not shown) for aligning liquid crystals of the liquid crystal layer 1700.

The liquid crystal layer 1700 is interposed between the display substrate 1500 and the opposite substrate 1600.

In an exemplary embodiment, the light source supplies the main and sub display parts with different lights, so that the main and sub display parts may be independently operated. Advantageously, a power consumption of the display device is smaller than that of a display device having a backlight assembly including a light source supplying a light on an entire of a light incident surface of a display panel.

In another exemplary embodiment, the sub display part has a smaller area than the main display part, and the light generated from the light source adjacent to the sub display part is guided toward only the sub display part in the sub mode. Advantageously, the luminance of the sub display part is increased, although the amount of the electric power applied to the light source adjacent to the sub display part is decreased.

In another exemplary embodiment, the main display part displays main images based on the white light and the sub display part displays sub images based on one of the red, green and blue lights. Advantageously, one of the red, green and blue lights may not be blocked by the color filter in the sub display part, so that the luminance of the sub display part is increased, and an image display quality of the sub image is improved.

In another exemplary embodiment, the display substrate includes the main driving region and the sub driving region, and the reflecting plate is formed in the sub driving region, so that each of the pixel regions of the sub driving region includes the reflection portion and the transmission portion. Advantageously, the luminance of the sub display part is increased in the sub mode, thereby improving image display quality.

This invention has been described with reference to the example embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A display device comprising:
   a backlight assembly comprising:
   a first light source generating a first light;
   a second light source generating a second light having a different color from the first light; and
   a light guiding unit guiding the first and second lights; and
   a display panel comprising:
   a main display part changing a color of the first light and displaying main images; and
   a sub display part displaying sub images using the second light, a color of the second light being substantially unchanged.

2. The display device of claim 1, wherein the display panel further comprises a color filter on the main display part, the color filter changing the color of the first light.

3. The display device of claim 2, wherein the display panel further comprises:
   a first substrate comprising a pixel electrode and a switching element applying a data signal to the pixel electrode;
   a second substrate comprising the color filter and a common electrode corresponding to the pixel electrode; and
   a liquid crystal layer interposed between the pixel electrode and the common electrode changing a light transmittance of the liquid crystal layer.

4. The display device of claim 1, wherein the first light source comprises a first light-emitting diode generating the first light being a white light, and
   the second light source comprises a second light-emitting diode generating the second light being one of red, green and blue lights.

5. The display device of claim 1, wherein the backlight assembly further comprises:
   a receiving container comprising:
   a bottom plate on which the light guiding unit is disposed; and
   a sidewall on which the first and second light sources are disposed; and
   a driving circuit part applying an electric power to the first and second light sources.

6. The display device of claim 5, wherein the light guiding unit comprises:
   a light guiding plate on the bottom plate; and
   optical sheets on the light guiding plate,
   wherein the light guiding unit further comprises a reflecting layer interposed between the main and sub light guiding plate, the reflecting layer optically isolating the main light guiding plate from the sub light guiding plate.

7. The display device of claim 6, wherein the first and second light sources are on a same side surface of the light guiding plate.

8. The display device of claim 6, wherein the light guiding plate comprises:
   a first side surface adjacent to the first light source; and
   a second side surface adjacent to the second light source.

9. The display device of claim 6, wherein the driving circuit part applies an electric power to the first light source in a main mode and applies an electric power to the second light source in a sub mode.

10. The display device of claim 5, wherein the light guiding unit further comprises:
    a main light guiding plate adjacent to the first light source and guiding the first light toward the main display part;
    a sub light guiding plate adjacent to the second light source and guiding the second light toward the sub display part; and
    optical sheets on the main and sub light guiding plates.

11. The display device of claim 10, wherein the driving circuit part applies an electric power to the first and second light sources in a main mode and applies an electric power to the second light source in a sub mode.

* * * * *